US009954590B2

(12) United States Patent
Yu et al.

(10) Patent No.: US 9,954,590 B2
(45) Date of Patent: Apr. 24, 2018

(54) METHODS FOR EFFICIENT BEAM TRAINING AND COMMUNICATIONS APPARATUS AND NETWORK CONTROL DEVICE UTILIZING THE SAME

(71) Applicant: MediaTek Inc., Hsin-Chu (TW)

(72) Inventors: Chia-Hao Yu, Yilan (TW); Ming-Po Chang, New Taipei (TW); Jiann-Ching Guey, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 60 days.

(21) Appl. No.: 14/938,103

(22) Filed: Nov. 11, 2015

(65) Prior Publication Data

US 2016/0065284 A1 Mar. 3, 2016

Related U.S. Application Data

(63) Continuation-in-part of application No. 14/717,144, filed on May 20, 2015.

(Continued)

(51) Int. Cl.
*H04L 12/26* (2006.01)
*H04B 7/06* (2006.01)
(Continued)

(52) U.S. Cl.
CPC ............ *H04B 7/061* (2013.01); *H04B 7/088* (2013.01); *H04L 5/0023* (2013.01);
(Continued)

(58) Field of Classification Search
None
See application file for complete search history.

(56) References Cited

U.S. PATENT DOCUMENTS

2002/0128044 A1  9/2002  Chang et al.
2009/0232240 A1  9/2009  Lakkis
(Continued)

FOREIGN PATENT DOCUMENTS

CN  101160742 A  4/2008
CN  101895497     11/2010
(Continued)

OTHER PUBLICATIONS

Parker, M.G., et al.; "Golay Complementary Sequences;" Jan. 2004; pp. 1-18.

*Primary Examiner* — Otis L Thompson, Jr.
(74) *Attorney, Agent, or Firm* — McClure, Qualey & Rodack, LLP

(57) ABSTRACT

A network control device includes a wireless communications module and a controller. The wireless communications module uses a preferred transmitting beam to communicate with a communications apparatus in one or more downlink opportunities corresponding to the preferred transmitting beam. The controller schedules signal or data to be transmitted in at least one downlink opportunity corresponding to the preferred transmitting beam. When scheduling signal or data to be transmitted, the controller further provides at least one training gap, in which the controller does not schedule any dedicated data to the communications apparatus, in the downlink opportunity corresponding to the preferred transmitting beam.

24 Claims, 32 Drawing Sheets

Related U.S. Application Data

(60) Provisional application No. 62/002,217, filed on May 23, 2014.

(51) Int. Cl.
*H04W 16/28* (2009.01)
*H04B 7/08* (2006.01)
*H04L 5/00* (2006.01)
*H04W 72/12* (2009.01)
*H04B 7/0456* (2017.01)

(52) U.S. Cl.
CPC ....... *H04W 16/28* (2013.01); *H04W 72/1289* (2013.01); *H04B 7/0456* (2013.01); *H04B 7/0617* (2013.01); *H04B 7/0619* (2013.01)

(56) References Cited

U.S. PATENT DOCUMENTS

| | | | |
|---|---|---|---|
| 2011/0110453 A1 | 5/2011 | Prasad et al. | |
| 2011/0211490 A1* | 9/2011 | Nikula | H04B 7/086 370/252 |
| 2012/0057575 A1 | 3/2012 | Taghavi Nasrabadi et al. | |
| 2012/0142288 A1 | 6/2012 | Hosoya et al. | |
| 2013/0072243 A1 | 3/2013 | Yu et al. | |
| 2013/0102345 A1* | 4/2013 | Jung | H04B 7/0456 455/513 |
| 2013/0121185 A1 | 5/2013 | Li et al. | |
| 2013/0272263 A1 | 10/2013 | Pi et al. | |
| 2013/0301454 A1 | 11/2013 | Seol et al. | |
| 2014/0044044 A1 | 2/2014 | Josiam et al. | |
| 2014/0056256 A1 | 2/2014 | Kim et al. | |
| 2014/0139372 A1 | 5/2014 | Seol et al. | |
| 2014/0254515 A1* | 9/2014 | Kim | H04W 74/0833 370/329 |
| 2015/0009951 A1* | 1/2015 | Josiam | H04L 25/0224 370/330 |
| 2015/0341095 A1 | 11/2015 | Yu et al. | |

FOREIGN PATENT DOCUMENTS

| | | |
|---|---|---|
| CN | 101978661 A | 2/2011 |
| CN | 103166692 | 6/2013 |
| CN | 103259573 | 8/2013 |
| WO | WO 2010/134737 | 11/2010 |
| WO | WO 2013/039352 | 3/2013 |

* cited by examiner

METHODS FOR EFFICIENT BEAM TRAINING AND COMMUNICATIONS APPARATUS AND NETWORK CONTROL DEVICE UTILIZING THE SAME

CROSS REFERENCE TO RELATED APPLICATIONS

This application is a Continuation-In-Part of pending U.S. patent application Ser. No. 14/717,144, filed on 2015 May 20 and entitled "Methods for efficient beam training and communications apparatus and Network control device utilizing the same", which claims the benefit of U.S. Provisional Application No. 62/002,217 filed on 2014 May 23 and entitled "ADAPTIVE BEAM TRAINING METHOD FOR WIRELESS SYSTEMS", the entire contents of which are hereby incorporated by reference.

BACKGROUND OF THE INVENTION

Field of the Invention

The invention relates to methods for efficient beam training, and more particularly to methods for hierarchical beam training.

Description of the Related Art

The term "wireless" normally refers to an electrical or electronic operation that is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations worldwide. They can be used anywhere, as long as there is a cellular telephone site to house equipment that can transmit and receive signals, which are processed to transfer both voice and data to and from the cellular telephones.

There are various well-developed and well-defined cellular communications radio access technologies (RATs). For example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. Wireless Fidelity (Wi-Fi) is a technology defined by the 802.11 engineering standard that can be used for home networks, mobile phones, and video games, to provide a high-frequency wireless local area network. The LTE (Long Term Evolution) and the LTE-Advanced evolved from the LTE are the 4G mobile communications systems, which provide high-speed data transmission over 2G and 3G systems.

The millimeter-wave band has the available spectrum and is capable of providing significantly higher-level throughputs than the microwave frequency band. Due to significantly higher attenuation levels and the directional nature of millimeter-wave signals, millimeter-wave devices (i.e., stations) generally employ highly-directional antennas as well as beamforming techniques for communicating.

Beamforming is a signal processing technique which allows to combine signals received from multiple antenna branches for special purpose, e.g., for SINR maximizing or for interference suppression.

By analog beamforming, the signal combination is performed in analog domain (before ADC) and is usually less flexible. The combined signal passes through ADC and at the digital domain, there is simply one branch of signal.

As for digital beamforming, the signal combination takes place in digital domain. For this to happen, the signals received from individual antenna branches go through individual ADC. With this approach, it is more flexible as we have multiple signals in digital domain for us to play with. However, in order to achieve this, it requires multiple processing chains in order to convert analog signals to digital domain. For example, multiple ADC is needed.

BRIEF SUMMARY OF THE INVENTION

A communications apparatus, a network control device, and methods for efficient beam training are provided. An exemplary embodiment of a network control device comprises a wireless communications module and a controller. The wireless communications module uses a preferred transmitting beam to communicate with a communications apparatus in one or more downlink opportunities corresponding to the preferred transmitting beam. The controller schedules signal or data to be transmitted in at least one downlink opportunity corresponding to the preferred transmitting beam. When scheduling signal or data to be transmitted, the controller further provides at least one training gap, in which the controller does not schedule any dedicated data to the communications apparatus, in the downlink opportunity corresponding to the preferred transmitting beam.

An exemplary embodiment of a communications apparatus comprises a wireless communications module and a controller. The wireless communications module is capable of supporting a plurality of receiving beams and using a preferred receiving beam to communicate with a network control device in one or more downlink opportunities corresponding to a preferred transmitting beam of the network control device. The preferred receiving beam and the preferred transmitting beam are determined in a previous beam training procedure. The controller trains at least one receiving beam other than the preferred receiving beam in at least one training gap of at least one downlink opportunity corresponding to the preferred transmitting beam by using the at least one receiving beam other than the preferred receiving beam to receive signals transmitted by the network control device via the preferred transmitting beam in the training gap.

An exemplary embodiment of a method for efficient beam training comprises determining a position of at least one training gap in at least one downlink opportunity corresponding to a preferred transmitting beam of a network control device, wherein the preferred transmitting beam is determined in a previous beam training procedure and the network control device uses the preferred transmitting beam to communicate with a communications apparatus; and not scheduling dedicated data transmission to the communications apparatus in the training gap.

An exemplary embodiment of a method for efficient beam training comprises: training at least one receiving beam other than a preferred receiving beam of a communications apparatus in at least one downlink opportunity corresponding to a preferred transmitting beam of a network control device by using the at least one receiving beam other than the preferred receiving beam to receive signals transmitted by the network control device in at least one training gap of the downlink opportunity corresponding to the preferred transmitting beam, wherein the preferred receiving beam and the preferred transmitting beam are determined in a previous beam training procedure; and using the preferred receiving beam to receive signal or dedicated data from the network control device in the remaining time of the downlink opportunity corresponding to the preferred transmitting beam.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
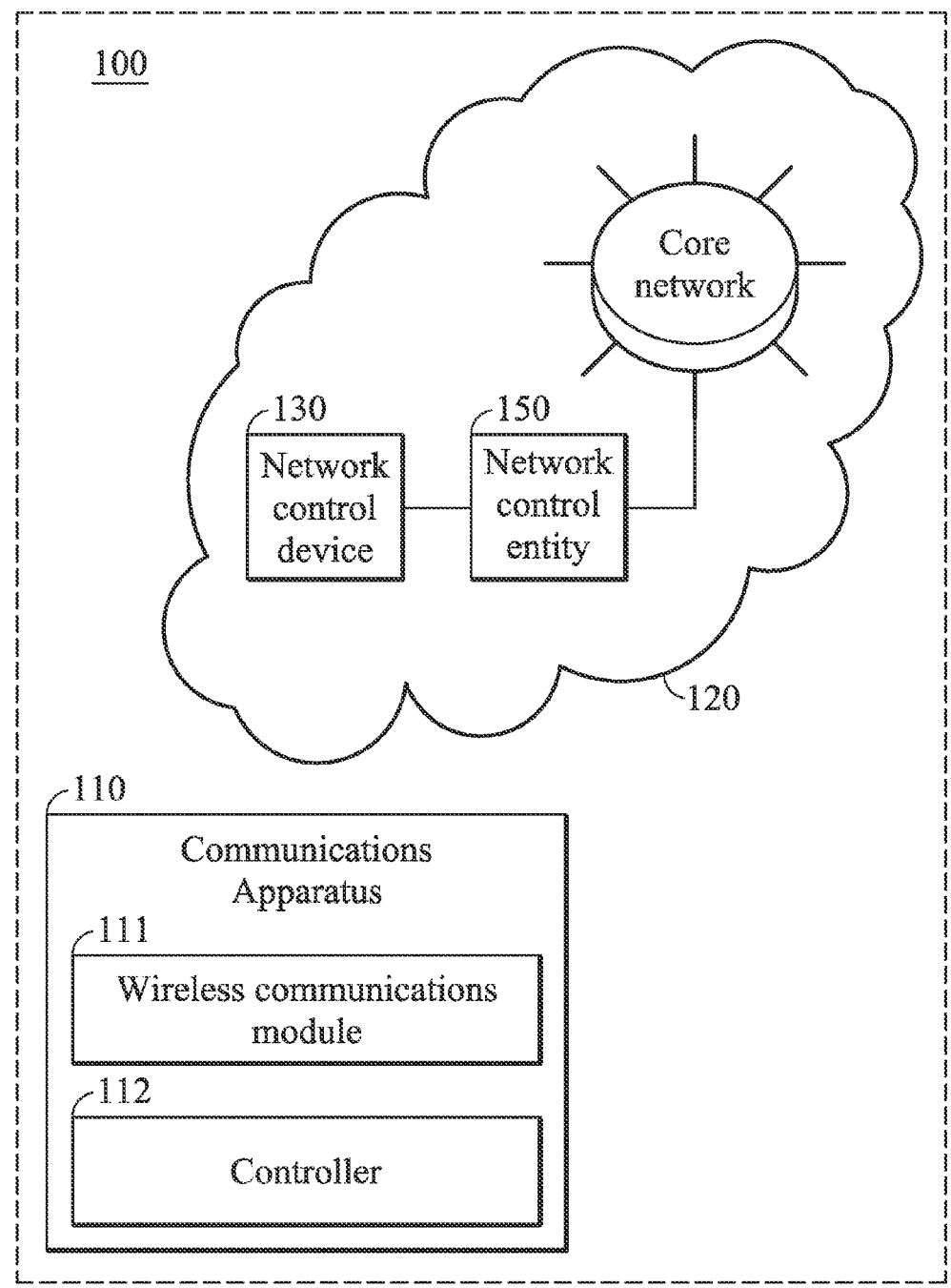
FIG. 1 is a block diagram illustrating a wireless communications system according to an embodiment of the invention.

FIG. 1 is a block diagram illustrating a wireless communications system according to an embodiment of the invention. In the wireless communications system 100, a communications apparatus 110 is wirelessly connected to a service network, such as the service network 120 shown in FIG. 1, for obtaining wireless communications services. Operations of the service network 120 are in compliance with a predetermined communications protocol. The service network 120 may comprise one or more network control devices, such as the network control device 130, interfacing between one or more communications apparatuses and the core network, for providing wireless communications services to the communications apparatus 110. The service network 120 may also comprise one or more intermediate control nodes, such as the network control entity 150 shown in FIG. 1, for controlling the operation of the one or more network control devices. In the embodiments of the invention, the network control entity may be a Base Station Controller (BSC), or it may be realized in a distributed manner without a centralized controller, or it may be a part of a base station's functionality, or the like, and it may be responsible for activating/deactivating and configuring signaling entities (which will be discussed further in the following paragraphs) under its control.

In addition, according to an embodiment of the invention, the network control device may be an evolved Node B (eNB), a Base Station (BS), a Base Station Controller (BSC), a Radio Network Controller (RNC), or the like. Note that in some embodiments of the invention, when the network control device is an eNB or a BS, the network control entity in the service network may be a BSC which can configure the network control devices.

According to an embodiment of the invention, the communications apparatus 110 may be a terminal node wirelessly connected to the service network, such as User Equipment (UE). The communications apparatus 110 may comprise at least a wireless communications module 111 for performing the functionality of wireless transmission and reception to and from the service network 120. To further clarify, the wireless communications module 111 may comprise at least a baseband signal processing device (not shown in FIG. 1) and a front-end signal processing device (not shown in FIG. 1). The baseband signal processing device may comprise multiple hardware devices to perform baseband signal processing, including Analog-to-Digital Conversion (ADC)/Digital-to-Analog Conversion (DAC), gain adjusting, modulation/demodulation, encoding/decoding, and so on. The front-end signal processing device may receive RF signals, process the RF signals, and convert the RF signals to baseband signals, which are to be processed by the baseband signal processing device, or the front-end signal processing device may receive baseband signals from the baseband signal processing device, convert the received baseband signals to RF signals and process RF signals which are later transmitted. The front-end signal processing device may also comprise multiple hardware devices to perform radio frequency conversion and RF signal processing. For example, the front-end signal processing device may comprise a mixer to multiply the baseband signals with a carrier oscillated in the radio frequency of the wireless communications system, where the radio frequency depends on the Radio Access Technology (RAT) in use. Also, the communications apparatus 110 may comprise a controller 112 for controlling the operation of the wireless communications module 111 and functional components (not shown) such as a display unit and/or keypad serving as the MMI (man-machine interface), a storage unit storing data and program codes of applications or communications protocols, and other functional components.

Note that, in order to clarify the concept of the invention, FIG. 1 presents a simplified block diagram, in which only the elements relevant to the invention are shown. Therefore, the invention should not be limited to what is shown in FIG. 1.

Figure 2:
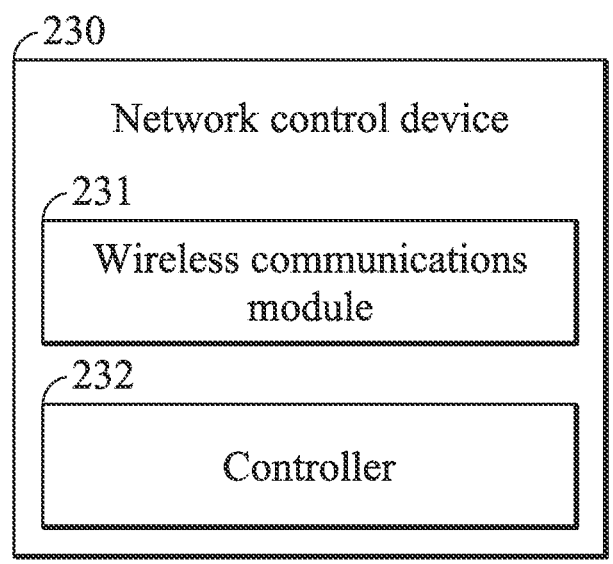
FIG. 2 shows a simplified block diagram of a network control device in the service network according to an embodiment of the invention.

FIG. 2 shows a simplified block diagram of a network control device in the service network according to an embodiment of the invention. According to an embodiment of the invention, the network control device may be an evolved Node B (eNB), a Base Station (BS), a Base Station Controller (BSC), a Radio Network Controller (RNC), or the like, and it may also be regarded as a communications apparatus for providing wireless communications services in the service network. The network control device 230 may also comprise at least a wireless communications module 231 for performing the functionality of wireless transmission and reception between the core network and one or more peer devices, such as the communications apparatus 110 shown in FIG. 1. To further clarify, the wireless communications module 231 may comprise a baseband signal processing device (not shown in FIG. 2) and a front-end signal processing device (not shown in FIG. 2). The baseband signal processing device may comprise multiple hardware devices to perform baseband signal processing, including Analog-to-Digital Conversion (ADC)/Digital-to-Analog Conversion (DAC), gain adjusting, modulation/demodulation, encoding/decoding, and so on. The front-end signal processing device may receive RF signals, process the RF signals, and convert the RF signals to baseband signals, which are to be processed by the baseband signal processing device, or the front-end signal processing device may receive baseband signals from the baseband signal processing device, convert the received baseband signals to RF signals and process RF signals which are later transmitted. The front-end signal processing device may also comprise multiple hardware devices to perform radio frequency conversion. For example, the front-end signal processing device may comprise a mixer to multiply the baseband signals with a carrier oscillated in the radio frequency of the wireless communications system, where the radio frequency depends on the RAT in use. Also, the network control device 230 may comprise a controller 232 for controlling the operation of the wireless communications module 231 and other functional components (not shown), such as a storage unit storing data and program codes of applications or communications protocols, or others.

Note that in order to clarify the concept of the invention, FIG. 2 presents a simplified block diagram, in which only the elements relevant to the invention are shown. Therefore, the invention should not be limited to what is shown in FIG. 2.

According to an embodiment of the invention, at least one of the network control devices (e.g. the network control device 130 or 230) and the communications apparatus (e.g. the communications apparatus 110) may comprise an antenna array which comprises a plurality of antenna elements for supporting analog-array beamforming. Analog-array beamforming is good for signal transmission and/or reception in a wireless communications system. To be more specific, the analog-array beamforming may provide array gain for compensating for severe path loss due to a harsh wireless propagation environment, and it may remove the need for training a channel response matrix between multiple antenna elements at transmitter (TX)/receiver (RX) sides.

Figure 3A:
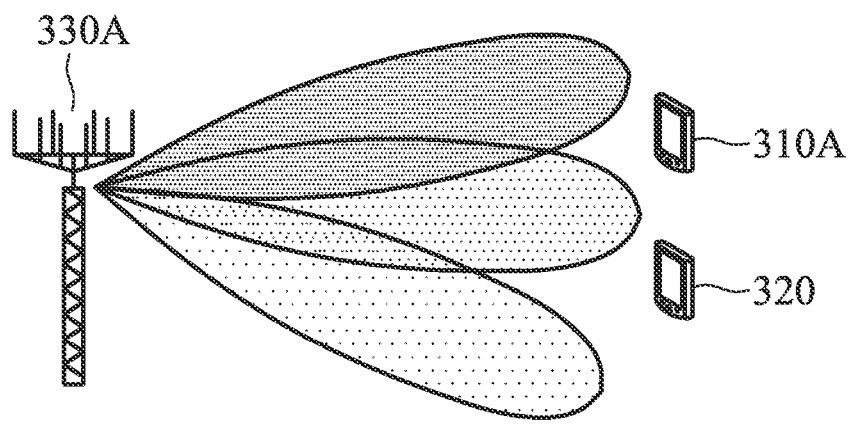
FIG. 3A is a schematic diagram showing an exemplary wireless communications system with at least a network control device supporting analog-array beamforming according to an embodiment of the invention.

FIG. 3A is a schematic diagram showing an exemplary wireless communications system with at least a network control device supporting analog-array beamforming according to an embodiment of the invention. As shown in FIG. 3A, the network control device 330A may be an eNB or a BS, and may be capable of generating a plurality of transmitting (TX) beams with different orientations and/or directing to different directions (angles). The communications apparatuses 310A and 320 may be the UEs and may respectively receive the same or different TX beams to obtain a better array gain for data transmission.

Figure 3B:
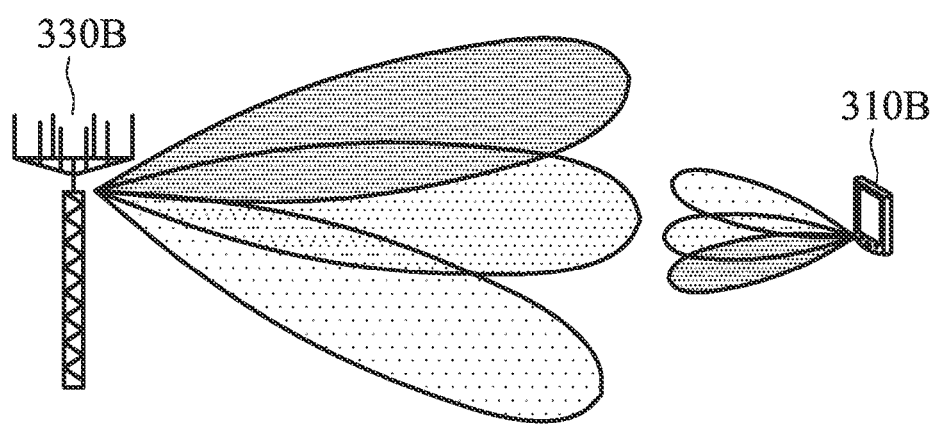
FIG. 3B is a schematic diagram showing another exemplary wireless communications system in which both the network control device and the communications apparatus support analog-array beamforming according to another embodiment of the invention.

FIG. 3B is a schematic diagram showing another exemplary wireless communications system in which both the network control device and the communications apparatus support analog-array beamforming according to another embodiment of the invention. As shown in FIG. 3B, the network control device 330B may be an eNB or a BS, and may be capable of generating a plurality of TX beams with different orientations and/or directing to different directions (angles). The communications apparatus 310B may be the UE, and it may also be capable of generating a plurality of TX beams with different orientations and/or directing to different directions (angles).

Generally, in cases when only the network control device supports analog-array beamforming, the TX beam training for the network control device is required. In addition, for cases when both the network control device and the communications apparatus support analog-array beamforming, the TX beam training and RX beam training for the network control device and the communications apparatus, respectively, are required. However, to select a proper transmitting beam from a large candidate set is resource-consuming, particularly if an exhaustive search is used. The complexity is further increased when both the TX beam training and RX beam training are required. Thus, efficient beam training methods are proposed in the following paragraphs.

Figure 4:
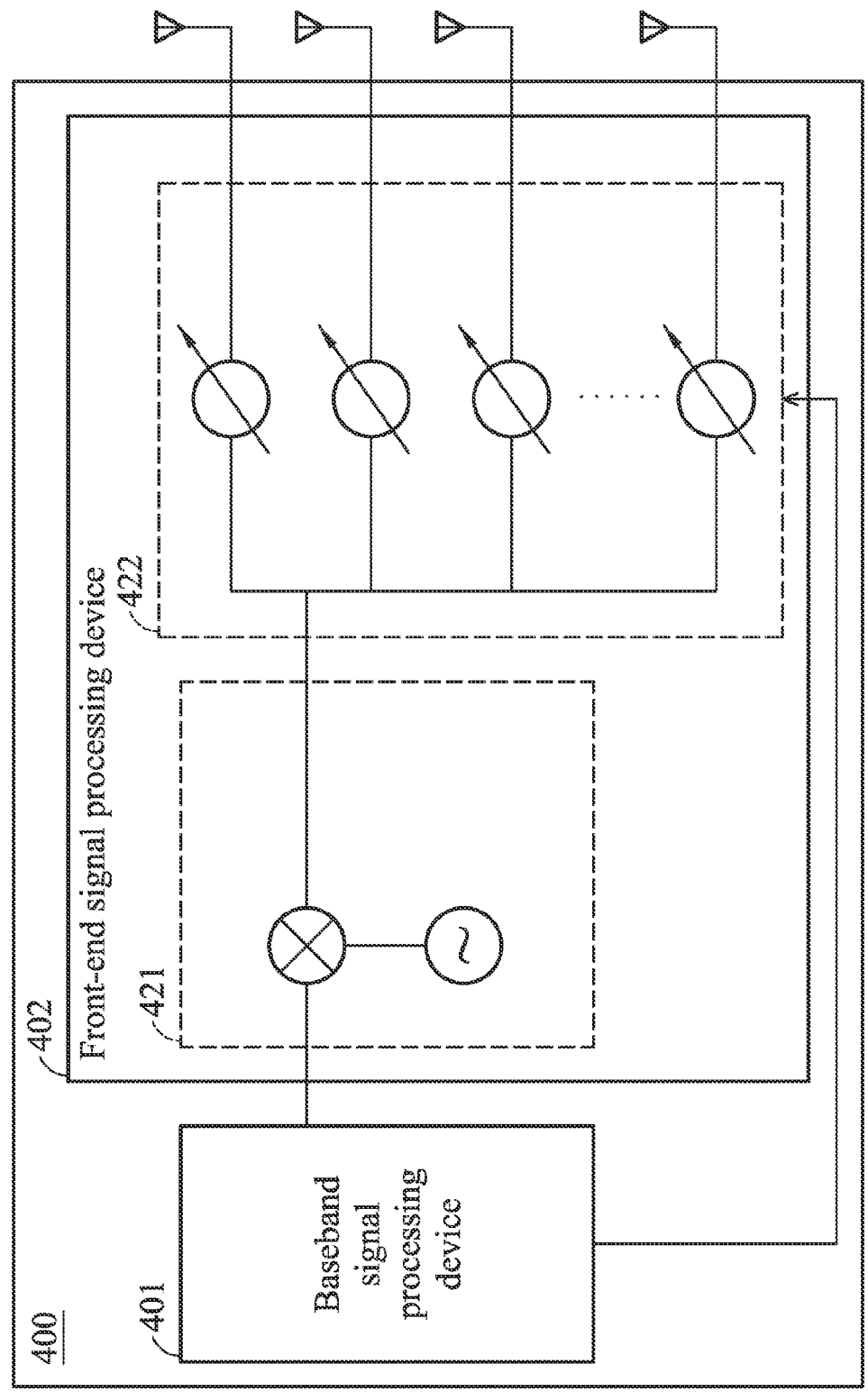
FIG. 4 shows an exemplary block diagram of a wireless communications module according to an embodiment of the invention.

FIG. 4 shows an exemplary block diagram of a wireless communications module according to an embodiment of the invention. The wireless communications module 400 may be the wireless communications module comprised in the communications apparatus and/or the network control device (note that in the embodiments of the invention, the network control device may also be regarded as a communications apparatus for providing wireless communications services in the service network). The wireless communications module 400 may comprise a baseband signal processing device 401 and a front-end signal processing device 402. As described above, the baseband signal processing device 401 may comprise multiple hardware devices to perform baseband signal processing, including Analog-to-Digital Conversion (ADC)/Digital-to-Analog Conversion (DAC), gain adjusting, modulation/demodulation, encoding/decoding, and so on. According to an embodiment of the invention, the baseband signal processing device 401 may also comprise a processor (not shown in FIG. 4) for controlling operations of the hardware devices. Note that in some embodiments of the invention, the devices for performing ADC and DAC may also be removed to the outside of the baseband signal processing device 401 and configured between the baseband signal processing device 401 and the front-end signal processing device 402, or they may be configured inside of the front-end signal processing device 402, and the invention should not be limited to any specific method of implementation.

The front-end signal processing device 402 may comprise a Radio Frequency (RF) signal processing module 421 and a phase controller 422. The RF signal processing module 421 may also comprise a plurality of hardware devices to perform radio frequency conversion and RF signal processing. For example, as shown in FIG. 4, the RF signal processing module 421 may comprise at least a mixer and an oscillator to perform radio frequency conversion. The phase controller 422 may comprise a plurality of paths, each being coupled to a corresponding antenna element and comprising at least a phase adjustor for adjusting the phase of the corresponding RF signal to be transmitted and/or adjusting the phase (or angle) of the corresponding antenna element. According to an embodiment of the invention, the phase adjustors may be controlled by the baseband signal processing device 401, such as the processor comprised in the baseband signal processing device 401. Note that in some embodiments of the invention, the RF signal processing module 421 may also be designed to comprise a plurality of signal processing chains, each corresponding to one transceiver chain and comprising a plurality of hardware devices to perform radio frequency conversion and RF signal processing as shown in FIG. 4, and the invention should not be limited to any specific method of implementation.

Note further that in some embodiments of the invention, the processor comprised in the baseband signal processing device may also control the operations of the whole of the wireless communications module, or, in some embodiments of the invention, the controller 112/232 and the processor controlling operations of the hardware devices of the baseband signal processing device may also be integrated together as one controller or processor. There may be plenty of different designs, and the invention should not be limited to any specific method of implementation.

Note further that, in order to clarify the concept of the invention, FIG. 4 presents a simplified block diagram, in which only the elements relevant to the invention are shown. Therefore, the invention should not be limited to what is shown on the FIG. 4.

Figure 5:
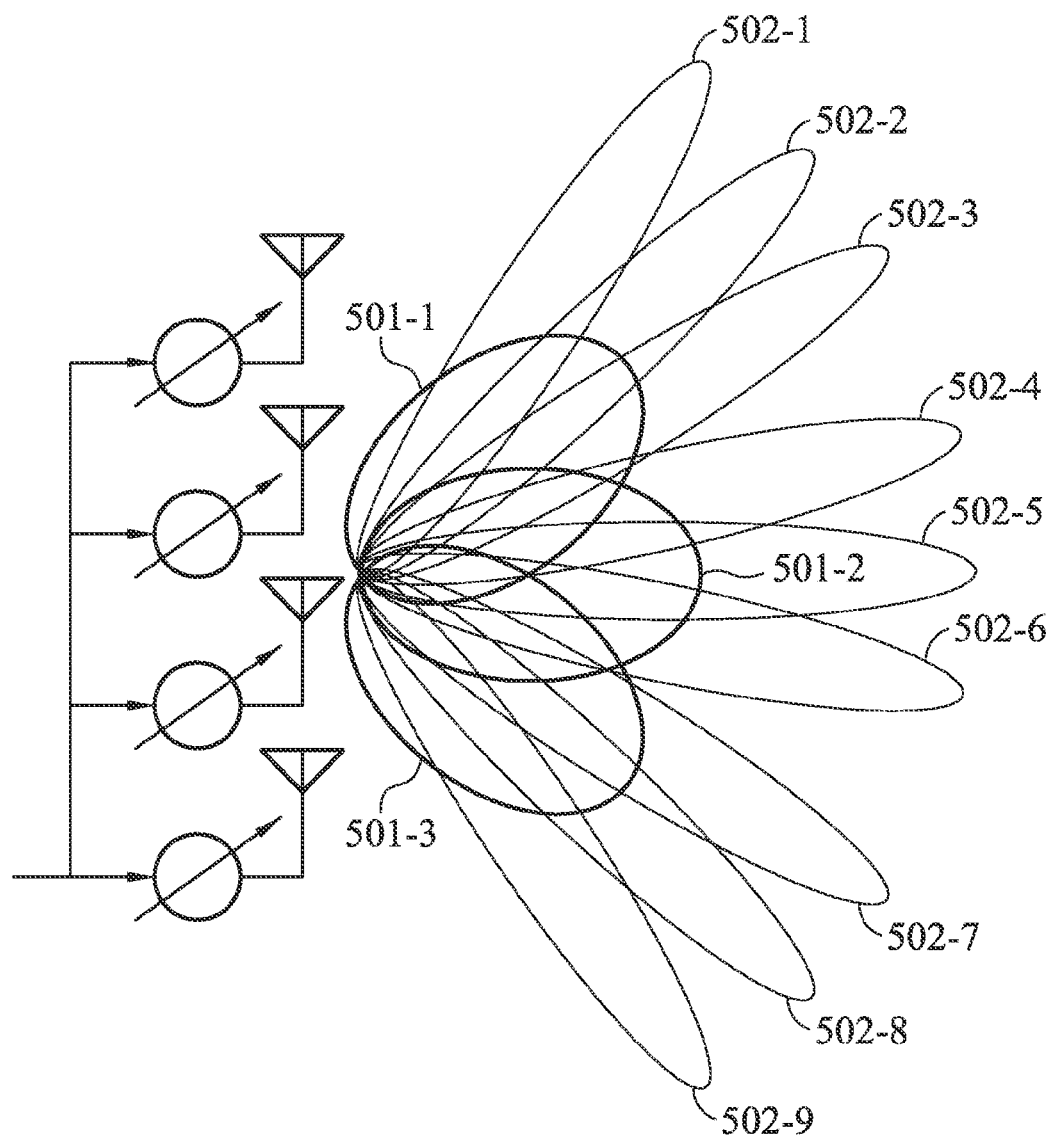
FIG. 5 shows a plurality of exemplary TX beams transmitted by a network control device or a communications apparatus according to an embodiment of the invention.

FIG. 5 shows a plurality of exemplary TX beams transmitted by a network control device or a communications apparatus according to an embodiment of the invention. According to an embodiment of the invention, the network control device and/or the communications apparatus supporting analog-array beamforming may be able to generate multi-level beams. As shown in FIG. 5, the beams 501-1~501-3 may belong to a first beam level Level 1, and the beams 502-1~502-9 may belong to a second beam level Level 2. Note that in an embodiment of the invention, only one beam can be formed at a time for transmission or reception, if there is only one RF transceiver.

According to an embodiment of the invention, the beams at different beam levels may have different spatial resolutions, which are also called the beam resolutions. In addition, the beams in different beam levels may have different beam widths. Each beam level may have a corresponding beam resolution. The beam resolutions may be distributed in ascending or descending order, depending on the starting beam level. In addition, the beams with finer beam resolution may have a higher array gain, and the beams with coarser beam resolution may have a smaller array gain. For example, since the beam width of the beams 501-1~501-3 belonging to the first beam level Level 1 is wider than the beam width of the beams 502-1~502-9 belonging to the second beam level Level 2, the beam resolution of the beams 501-1~501-3 is coarser than the beam resolution of the beams 502-1~502-9 and the array gain of the beams 502-1~502-9 is higher than the array gain of the beams 501-1~501-3.

Figure 6:
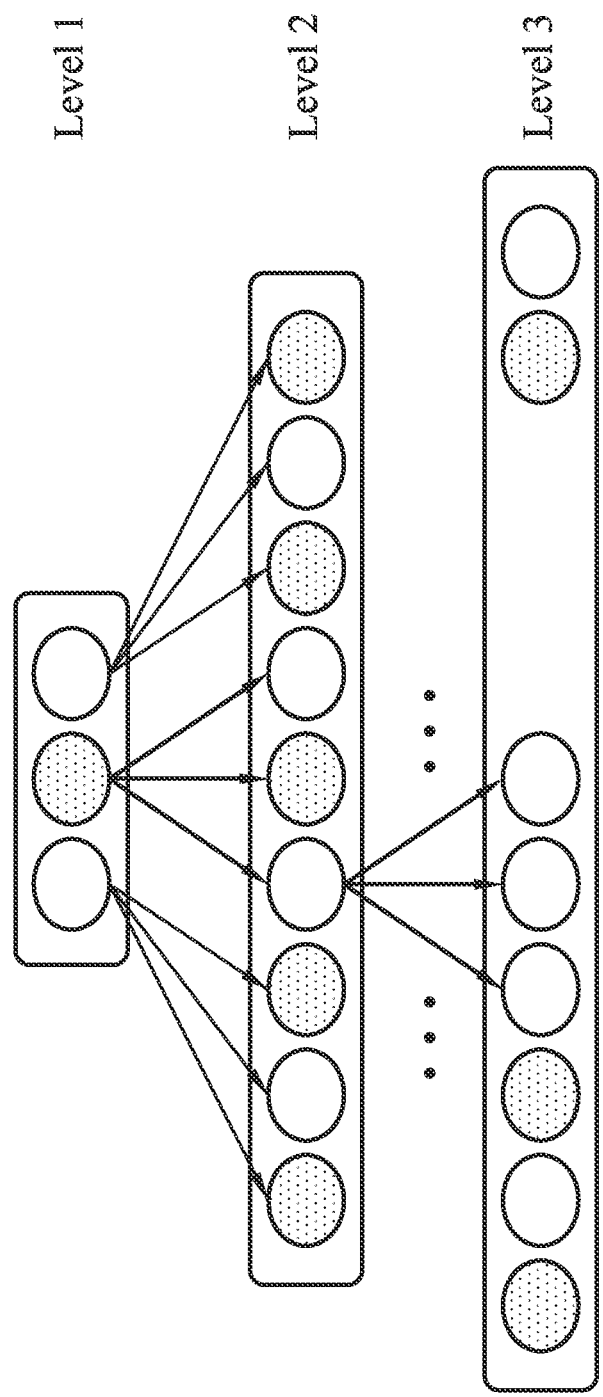
FIG. 6 is a schematic diagram illustrating the tree-like structure of the multi-level beams according to an embodiment of the invention.

In addition, according to an embodiment of the invention, the beam levels may be hierarchical beam levels. FIG. 6 is a schematic diagram illustrating the tree-like structure of the multi-level beams according to an embodiment of the invention. In FIG. 6, each circle represents a beam. There are three beam levels shown in FIG. 6, including Level 1, Level 2 and Level 3. The beam levels Level 1, Level 2 and Level 3 are hierarchical beam levels, and the beam resolution and array gain of the beams in the hierarchical beam levels may be distributed in ascending order from the first beam level Level 1 to the third beam level Level 3. That is, the beam resolution of the beams in Level 2 is finer than the beam resolution of the beams in Level 1, and the beam resolution of the beams in Level 3 is finer than the beam resolution of the beams in Level 2. In addition, the array gain of the beams in Level 2 is higher than the array gain of the beams in Level 1, and the array gain of the beams in Level 3 is higher than the array gain of the beams in Level 2.

In addition, according to an embodiment of the invention, a beam in a certain beam level is associated with several beams in the next level. Here, the term "associate" indicates an overlapping beam main pattern (that is, main-lobe of the beam) between two concerned beams. For example, as shown in FIG. 5, the beam 501-1 in the first beam level Level 1 is associated with the beams 502-1~502-3 in the second beam level Level 2. The angular coverage area of the beam 501-1 substantially covers the angular coverage areas of the beams 502-1~502-3 and the beam main pattern of the beam 501-1 is overlapped with the beam main patterns of the beams 502-1~502-3. In addition, the beam 501-2 in the first beam level Level 1 is associated with the beams 502-4~502-6 in the second beam level Level 2. The angular coverage area of the beam 501-2 substantially covers the angular coverage areas of the beams 502-4~502-6 and the beam main pattern of the beam 501-2 is overlapped with the beam main patterns of the beams 502-4~502-6. In addition, the beam 501-3 in the first beam level Level 1 is associated with the beams 502-7~502-9 in the second beam level Level 2. The angular coverage area of the beam 501-3 substantially covers the angular coverage areas of the beams 502-7~502-9 and the beam main pattern of the beam 501-3 is overlapped with the beam main patterns of the beams 502-7~502-9. In addition, in an embodiment of the invention, aggregated angular coverage area of the beams in the second beam level Level 2 is preferably the same as that of the first beam level Level 1. The beam association characteristic is also shown in FIG. 6.

Figure 7:
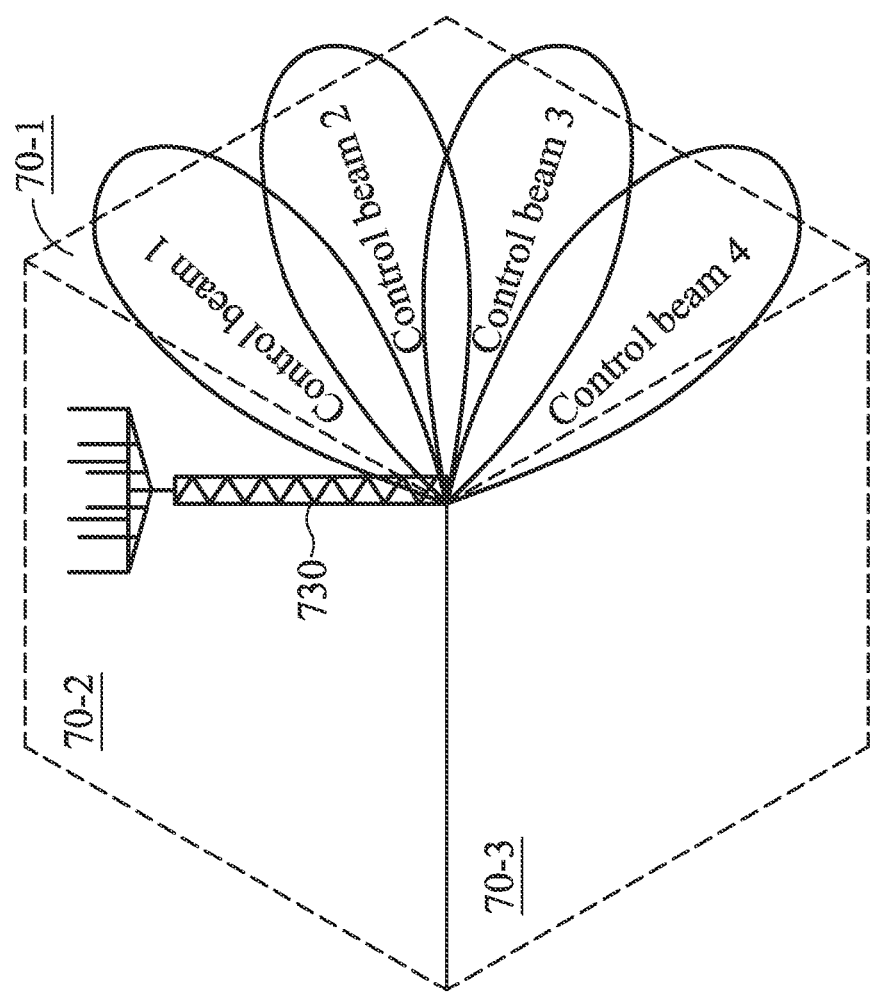
FIG. 7 is a schematic diagram showing system assumptions according to an embodiment of the invention.

FIG. 7 is a schematic diagram showing system assumptions according to an embodiment of the invention. In the embodiments of the invention, it is assumed that the network control device (such as an eNB, BS, or the like) 730 has no knowledge of the antenna array capability of the communications apparatus (such as an UE under its coverage and using its services). The network control device 730 may comprise three sectors 70-1, 70-2 and 70-3. At least one sector, such as the sector 70-1, is served by a manageable number of control beams (such as the control beam 1~control beam 4 shown in FIG. 7). The network control device 730 may use the control beams to transmit control signals, training sequences and/or reference signals. Therefore, the control beams are utilized to serve control channels of the network control device 730. The control signals may comprise basic information for initial system access. For example, the control signals may comprise information for the communications apparatus to synchronize and communicate with the network control device 730. The training sequences may be utilized for beam training (which will be discussed in more detail in the following paragraphs).

Figure 8:
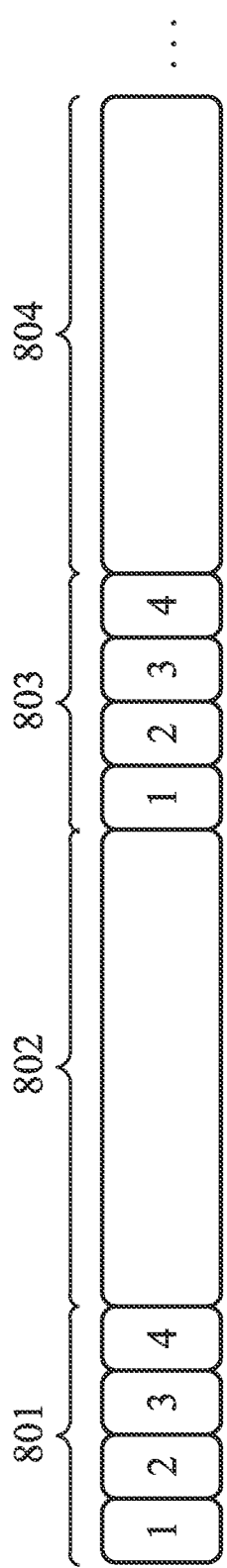
FIG. 8 is a schematic diagram showing the timing schedule of a network control device according to an embodiment of the invention.

According to an embodiment of the invention, the control beams may be utilized by the network control device 730 in a time-division manner. FIG. 8 is a schematic diagram showing the timing schedule of a network control device according to an embodiment of the invention. As shown in FIG. 8, the period 801 is utilized for downlink transmission and the period 803 is utilized for uplink reception. In addition, the periods 802 and 804 are utilized for dedicated data transmission. The block labeled with the number '1' during the period 801 represents the downlink opportunity of the control beam 1, the block labeled with the number '2' during the period 801 represents the downlink opportunity of the control beam 2, and so on. Similarly, the block labeled with the number '1' during the period 803 represents the uplink opportunity of the control beam 1, the block labeled with the number '2' during the period 803 represents the uplink opportunity of the control beam 2, and so on.

Note that in the embodiments of the invention, array reciprocity is applied. That is, the TX beams of the network control device are equivalent to the RX beams of the network control device. Similarly, the TX beams of the communications apparatus are equivalent to the RX beams of the communications apparatus. Therefore, a beam (including the control beam of the network control device) of the network control device may be utilized for both downlink transmission and uplink reception, and a beam of the communications apparatus may be utilized for both downlink reception and uplink transmission.

Note further that in the embodiments of invention, the sequential training sequences may be transmitted in a transmission by transmission manner. In addition, in the embodiments of the invention, 1-to-many beam training is achieved such that the network control device may be able to train a plurality of communications apparatuses in a beam training procedure.

Note further that in the embodiments of the invention, it is assumed that the control beams of the network control device are the beams with the coarsest beam resolution and widest beam width among all the beams supported by the network control device. Therefore, the control beams have the widest angular coverage area among all the beams supported by the network control device.

In the following paragraphs, several methods for efficient beam training will be illustrated. In the embodiments of the invention, methods for hierarchical beam training are proposed, in which the beams with coarser beam resolution are trained first. After that, the beams with finer beam resolution are selected based on the previous training results and are trained further. The training results may be obtained by calculating a detection metric. For example, the trainee side may pre-store a set of candidate training sequences. Each candidate training sequence may correspond to a specific TX beam of the trainer. After receiving the training sequence carried in a specific TX beam from the trainer side, the trainee may calculate the correlation between the received training sequence and each candidate training sequence in the set of candidate training sequences to generate the detection metric. The trainee may further determine an optimum candidate training sequence having the highest (and a high enough) correlation with the received training sequence from the detection metric and find out the TX beam of the trainer corresponding to the optimum candidate training sequence. Thereby the training result is obtained. The beam training procedure may be continuously performed level-by-level until a satisfactory array gain is obtained.

According to an embodiment of the invention, if a detection metric is signaled to trainer, an index is needed to indicate which transmitting beams is associated with the signaled detection metric. In general, there are several options for signaling: 1). Signal the preferred TX beam. The trainee can simply indicate an index (thus, the beam is selected by trainee). 2). Signal a few strongest TX beams and their detection metric. The trainee needs to signal both detection metric and indices of these beams. 3). Signal all detection metric to trainer, and the trainer selects one based on the feedback (just detection metrics are fed back if the metrics are properly arranged).

Note that in the embodiments of the invention, the trainer represents the one transmitting the training sequence or transmitting any training signal, and the trainee represents the one receiving the training sequence or receiving any training signal. Therefore, depending on different scenarios, the trainer may be the eNB/BS or the UE, and the trainee may be the UE or the eNB/BS. Note further that in some embodiments, the trainee may also transmit the detection metric to the trainer. The trainer may determine an optimum TX/RX beam according to the received detection metric.

In a first aspect of the invention, suppose that the network control device (such as an eNB, BS, or the like) has no prior knowledge about the preferred control beam of the communications apparatus (such as an UE under its coverage), joint operation of control beam selection and UE receiving beam training are proposed.

Figure 9:
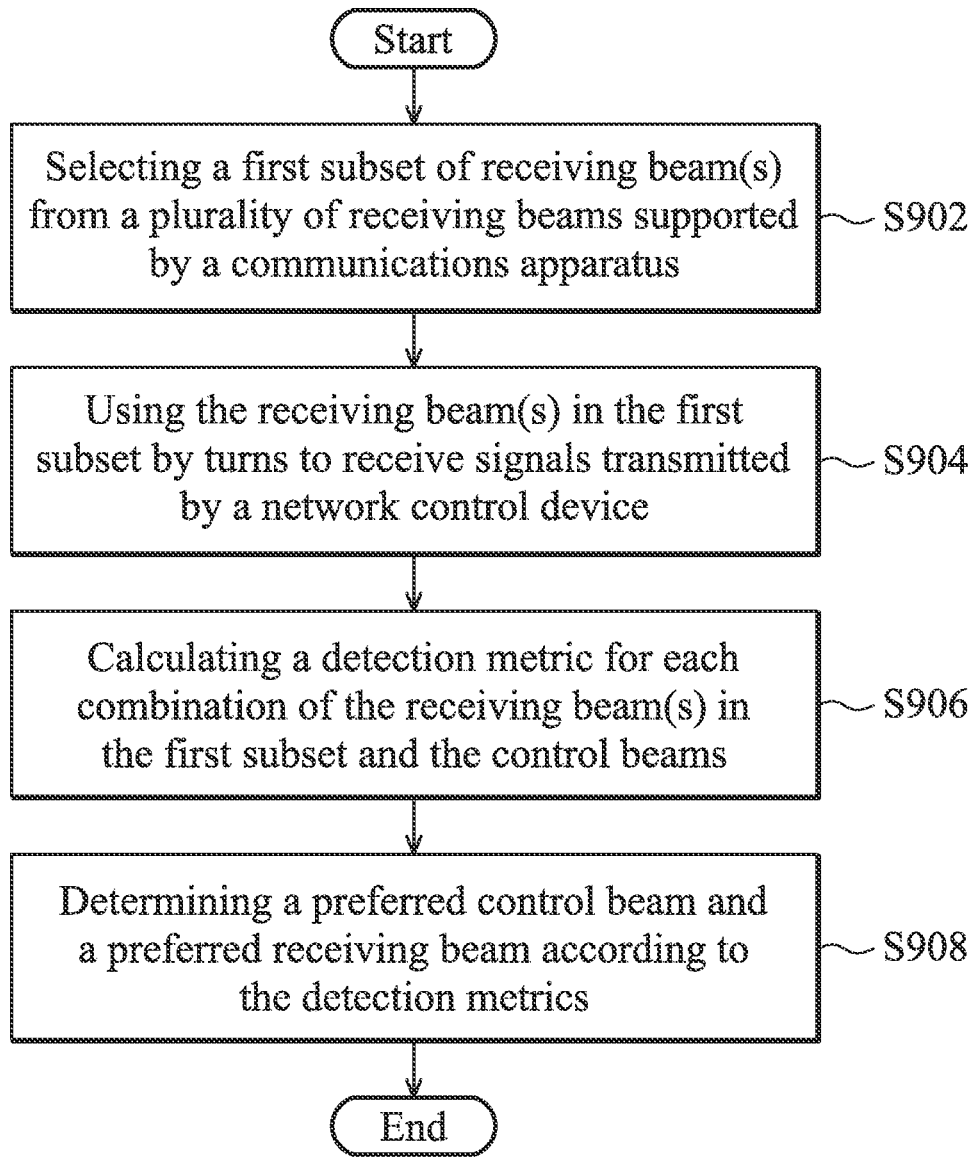
FIG. 9 is a flow chart of a method for efficient beam training according to the first aspect of the invention.

FIG. 9 is a flow chart of a method for efficient beam training according to the first aspect of the invention. The communications apparatus may first select a first subset of receiving beam(s) from a plurality of receiving beams that it can support (Step S902). According to an embodiment of the invention, the receiving beam(s) comprised in the first subset may have the widest beam width among the plurality of receiving beams that it can support. Note that the receiving beam(s) comprised in the first subset may also have a beam width that is narrower than the widest beam width, and the invention should not be limited thereto.

Next, the communications apparatus may use the receiving beam(s) in the first subset in turn to receive signals transmitted by a network control device (Step S904). Next, the communications apparatus may calculate a detection metric for each combination of the receiving beam(s) in the first subset and the control beams (Step S906). Finally, the communications apparatus may determine a preferred control beam and a preferred receiving beam according to the detection metrics (Step S908).

According to a first embodiment of the invention, the controller (such as the controller 112) of the communications apparatus may select a first subset of receiving beam(s) from a plurality of receiving beams supported by the wireless communications module (such as the wireless communications module 111) of the communications apparatus. The wireless communications module may use the receiving beam(s) in the first subset in turn to receive signals transmitted by a network control device for a first stage of beam training. As described above, the network control device may use each of a plurality of control beams in turn to transmit the signals. The wireless communications module may use the receiving beam(s) in the first subset in turn to receive the signals transmitted by the network control device at a downlink opportunity corresponding to each control beam.

After receiving the signals, the controller may further calculate a detection metric for each combination of the receiving beam(s) in the first subset and the control beams, and determine a preferred control beam and a preferred receiving beam according to the detection metrics for the first stage of beam training After determining the preferred control beam, the wireless communications module may further transmit an indication signal comprising information regarding the preferred control beam to the network control device at an uplink opportunity corresponding to the preferred control beam. Note that in the embodiments of the invention, the network control device does not have to know the preferred receiving beam of the communications apparatus. Therefore, the communications apparatus does not have to transmit information regarding the preferred receiving beam determined in the beam training procedure to the network control device.

Figure 10:
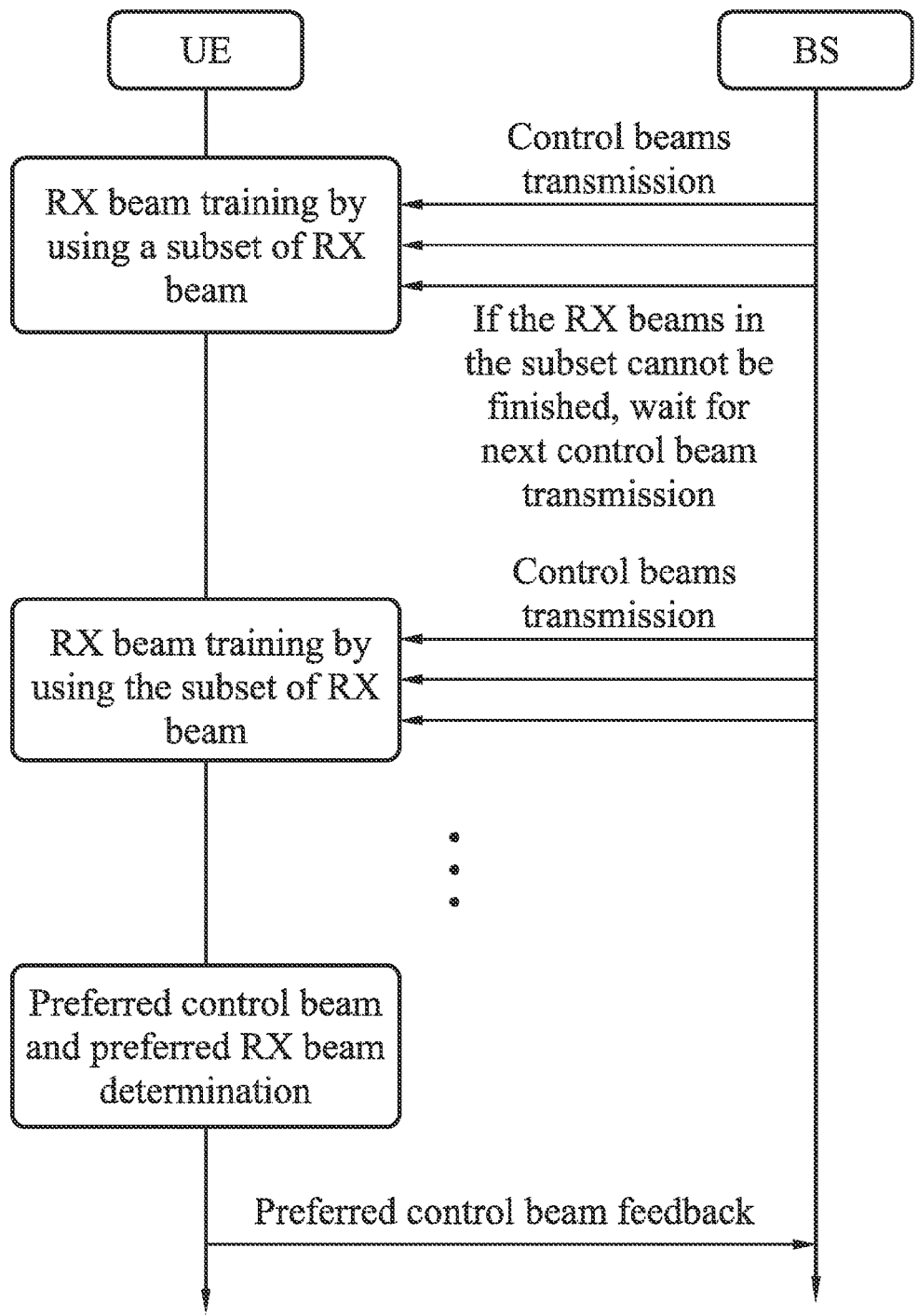
FIG. 10 is an exemplary flow chart showing the operations of the UE and the BS according to the first embodiment of the invention.

FIG. 10 is an exemplary flow chart showing the operations of the UE and the BS according to the first embodiment of the invention. The BS may continuously use the control beams to transmit signals. The UE may perform RX beam training by using a subset of RX beam to receive the signals transmitted by each control beam. If the trainings of all RX beams in the subset cannot be finished within a round of control beam transmission, the UE may wait for the next round of control beam transmission to continue the RX beam training After the RX beam training is finished, the UE may determine a preferred control beam and a preferred RX beam from the subset, and feedback the preferred control beam to the UE as discussed above.

According to a second embodiment of the invention, when the first stage of beam training as discussed above fails, the controller of the communications apparatus may further select a second subset of receiving beam(s) from the plurality of receiving beams supported by the wireless communications module of the communications apparatus. The wireless communications module may use the receiving beam(s) in the second subset in turn to receive the signals transmitted by the network control device via the control beams for a second stage of beam training According to an embodiment of the invention, the beam training may fail when none of the correlations in the obtained detection metrics is high enough due to high path loss. In this manner, the controller may decide to begin a second stage of beam training to train a second subset of receiving beam(s).

According to a preferred embodiment of the invention, in order to obtain higher array gain to overcome the high path loss problem, at least one of the receiving beam(s) comprised in the second subset may have a beam width that is narrower than the beam width of at least one of the receiving beam(s) comprised in the first subset. Therefore, when the receiving beam(s) comprised in the first subset has/have the widest beam width among the plurality of receiving beams that the communications apparatus can support, at least one of the receiving beam(s) comprised in the second subset may have a beam width narrower than the widest beam width.

After receiving the signals from the network control device, the controller may further calculate a detection metric for each combination of the receiving beam(s) in the second subset and the control beams, and determine a preferred control beam and a preferred receiving beam according to the detection metrics for the second stage of beam training.

Figure 11:
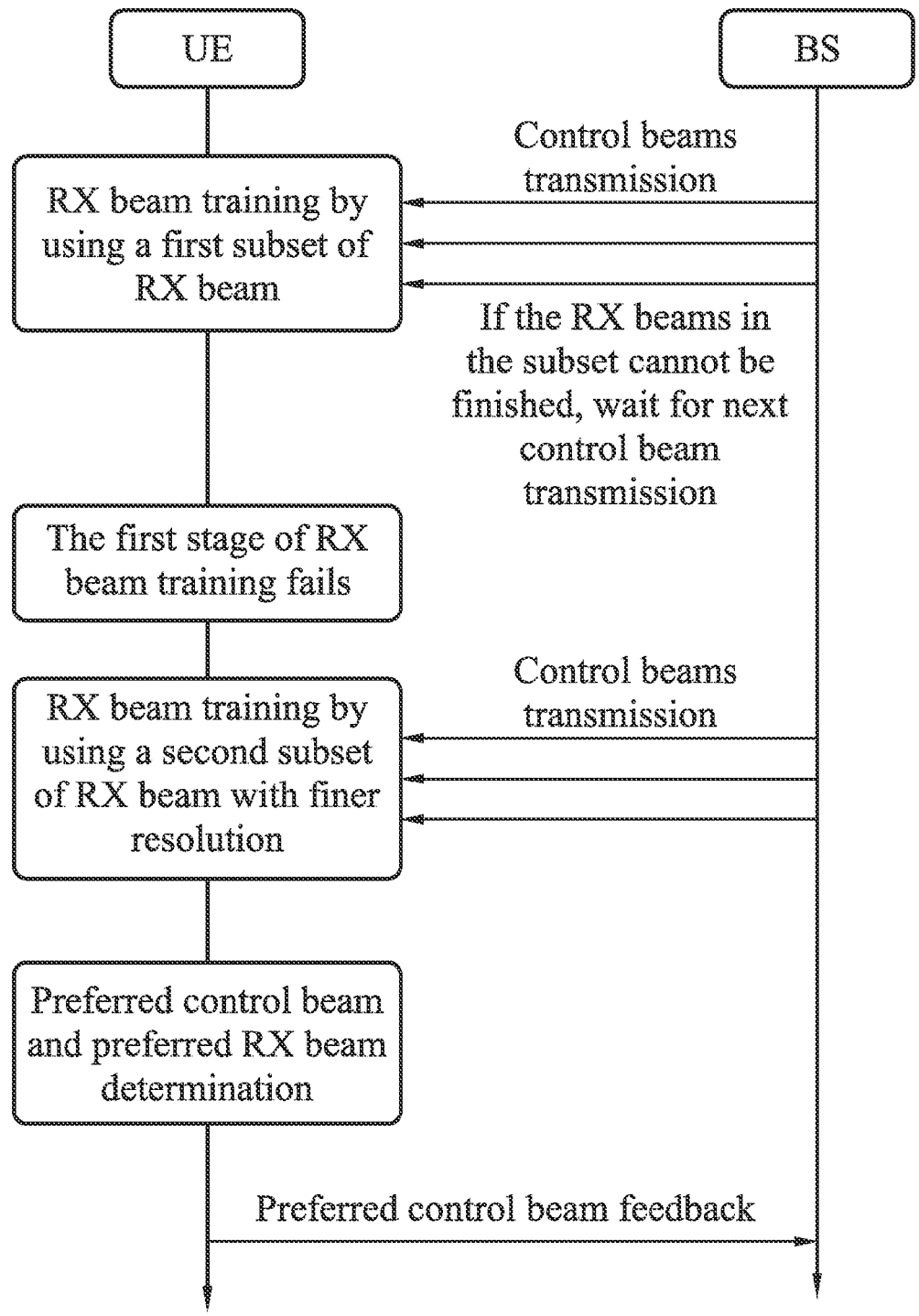
FIG. 11 is an exemplary flow chart showing the operations of the UE and the BS according to the second embodiment of the invention.

FIG. 11 is an exemplary flow chart showing the operations of the UE and the BS according to the second embodiment of the invention. The BS may continuously use the control beams to transmit signals. The UE may perform RX beam training by using a first subset of an RX beam to receive the signals transmitted by each control beam. If the trainings of all RX beams in the first subset cannot be finished within a round of control-beam transmission, the UE may wait for the next round of control beam transmission to continue the RX beam training. As discussed above, the RX beam(s) in the first subset may have coarser beam resolution. If the UE is unable to determine a preferred control beam and a preferred RX beam from the first subset, the first stage of beam training fails.

Next, the UE may perform RX beam training again by using a second subset of RX beam with finer beam resolution to receive the signals transmitted by each control beam. After the RX beam training is finished, the UE may determine a preferred control beam and a preferred RX beam from the subset, and feed back the preferred control beam to the UE as discussed above.

Note that in the second embodiment of the invention, the hierarchical beam training is achieved at the UE side. The UE may start training from the RX beams with coarsest or coarser beam resolution to reduce training latency. If training of RX beams with the coarsest or coarser beam resolution fails, the UE may choose RX beams with a finer beam resolution to increase the array gain for compensating for path loss. The beam-training procedure may be repeatedly performed for several rounds until a satisfactory array gain and/or a satisfactory correlation is obtained.

According to a third embodiment of the invention, when the first stage of beam training as discussed above is completed, the controller of the communications apparatus may further select a second subset of receiving beam(s) from the plurality of receiving beams supported by the wireless communications module of the communications apparatus. The wireless communications module may use the receiving beam(s) in the second subset in turn to receive the signals transmitted by the network control device via the preferred control beam for a second stage of beam training. The wireless communications module may use the receiving beam(s) in the second subset to receive the signals transmitted by the network control device at the downlink opportunities corresponding to the preferred control beam.

In the third embodiment of the invention, at least one of the receiving beam(s) comprised in the second subset associates with the preferred receiving beam determined in the first stage of beam training. As discussed above, "associate" indicates an overlapping beam main pattern (that is, the main-lobe of the beam) between two concerned beams. Therefore, in the third embodiment of the invention, the beam main pattern of a receiving beam comprised in the second subset is preferably overlapped with the beam main pattern of the preferred receiving beam, and the angular coverage area of the preferred receiving beam preferably covers the aggregated angular coverage area(s) of the receiving beam(s) comprised in the second subset at most.

After receiving the signals from the network control device, the controller may further calculate a detection metric for each combination of the receiving beam(s) in the second subset and the preferred control beams, and determine a preferred receiving beam from the receiving beam(s) in the second subset according to the detection metrics for the second stage of beam training.

Figure 12:
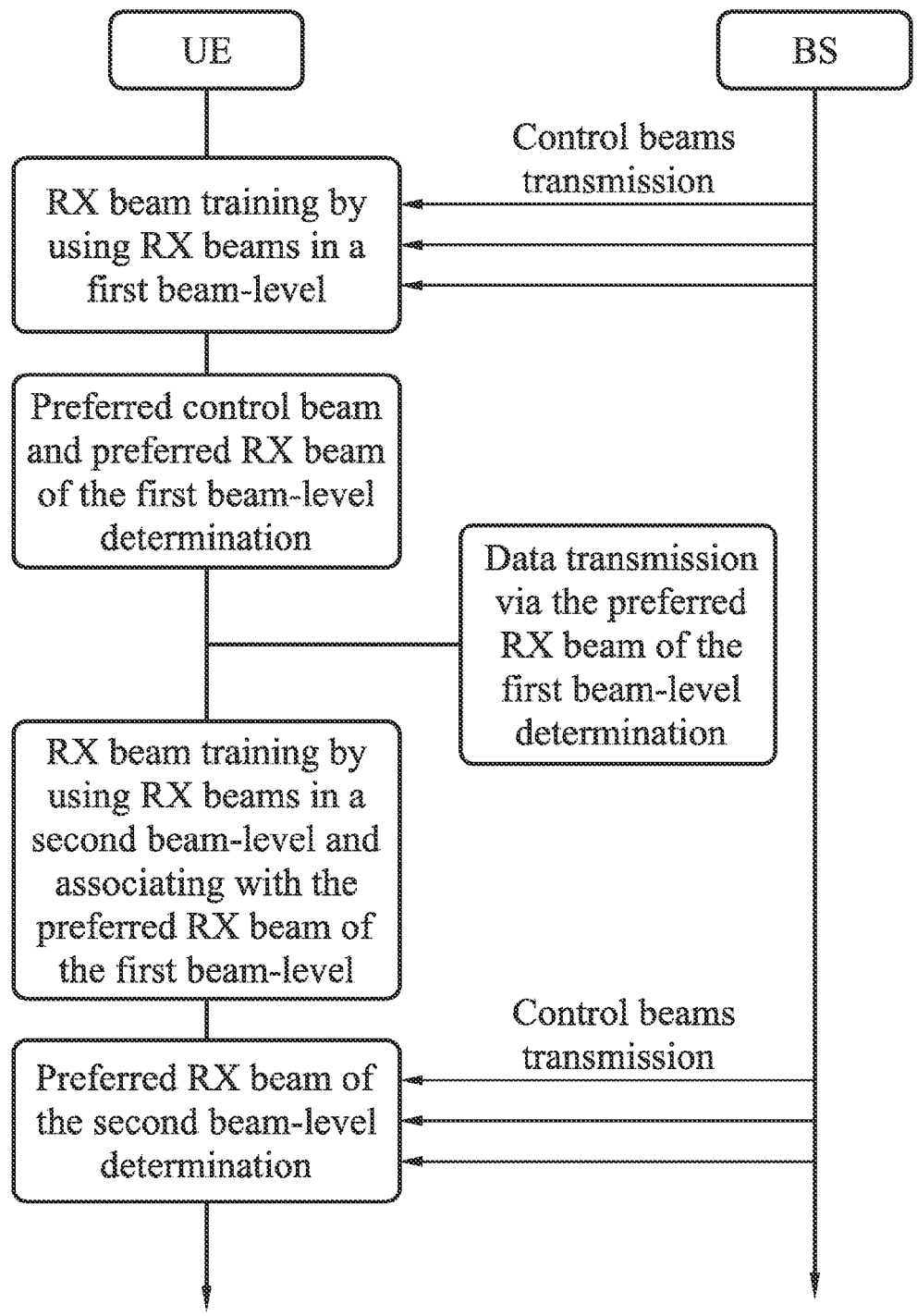
FIG. 12 is an exemplary flow chart showing the operations of the UE and the BS according to the third embodiment of the invention.

FIG. 12 is an exemplary flow chart showing the operations of the UE and the BS according to the third embodiment of the invention. The BS may continuously use the control beams to transmit signals. The UE may perform RX beam training by using one or more RX beams in a first beam level to receive the signals transmitted by each control beam. When the RX beam training for the first beam level finishes, the UE may determine a preferred control beam and a preferred RX beam of the first beam level.

According to an embodiment of the invention, when the preferred RX beam of the first beam level have been determined, the UE may begin data transmission with the network control device by using the preferred RX beam (note that since array reciprocity applies in the invention, the preferred RX beam may be utilized for both downlink reception and uplink transmission).

In addition, the UE may further perform another RX beam training by using one or more RX beams in a second beam level that are associated with the preferred RX beam previously determined to receive the signals transmitted by the network control device via the preferred control beam. When the RX beam training for the second beam level finishes, the UE may determine a preferred RX beam of the second beam level. In the embodiments of the invention, the UE may further determine to use the preferred RX beam of the first beam level or the preferred RX beam of the second beam level (or to use both of them) for subsequent data reception. Note that the beam training procedure may further be performed in several rounds for the RX beams in the beam level(s) with even finer resolution until a satisfactory array gain and/or a satisfactory correlation is obtained.

Note that in the third embodiment of the invention, the hierarchical beam training is achieved at the UE side based on a multi-level codebook. In the embodiments of the invention, the multi-level codebook may record a plurality of pre-defined settings for setting the antenna array to generate a multi-level beam pattern. Therefore, each setting in the multi-level codebook may correspond to a predetermined TX/RX beam. The UE may train the RX beams in different beam levels with the beam resolutions increased in ascending order as illustrated above until a satisfactory array gain and/or a satisfactory correlation is obtained.

According to a fourth embodiment of the invention, when the first stage of beam training as discussed above is completed, the controller of the communications apparatus may further fine-tune a direction, angle, and/or beam width of the preferred receiving beam determined in the first stage of beam training to generate one or more refined receiving beam(s). The wireless communications module may use the one or more refined receiving beam(s) in turn to receive the signals transmitted by the network control device via the preferred control beam for a second stage of beam training.

After receiving the signals from the network control device, the controller may further calculate a detection metric for each combination of the one or more refined receiving beam(s) and the preferred control beam, and determine a preferred receiving beam from the one or more refined receiving beam(s) according to the detection metrics for the second stage of beam training.

In the embodiments of the invention, the controller may fine tune the direction, angle, and/or beam width of the preferred receiving beam determined in the first stage of beam training based on the multi-level codebook or beyond the multi-level codebook. In other words, the refined receiving beam(s) may or may not be the predetermined RX beam defined by the codebook.

In addition, in some embodiments of the invention, the communications apparatus may start another beam training procedure to search for a second Angle of Arrival (AoA), where the preferred receiving beam determined in a previous beam training procedure (such as the first stage of beam training as illustrated above when the first stage of beam training as discussed above is completed) is regarded as the first AoA. To be more specific, in some embodiments of the invention, when the first stage of beam training as discussed above is completed, the controller may further select a second subset of receiving beam(s) from the plurality of receiving beams supported by the wireless communications module. The wireless communications module may use the receiving beam(s) in the second subset in turn to receive the signals transmitted by the network control device via the control beams for a second stage of beam training.

After receiving the signals from the network control device, the controller may further calculate a detection metric for each combination of the receiving beam(s) in the second subset and the control beams, and determine another preferred control beam and another preferred receiving beam as the second AoA according to the detection metrics for the second stage of beam training. In the embodiments of the invention, the communications apparatus may further send preferred control beams corresponding to the first and second AoAs to the network control device, and the network control device may decide which one is (or both of them are) used for communication.

Figure 13:
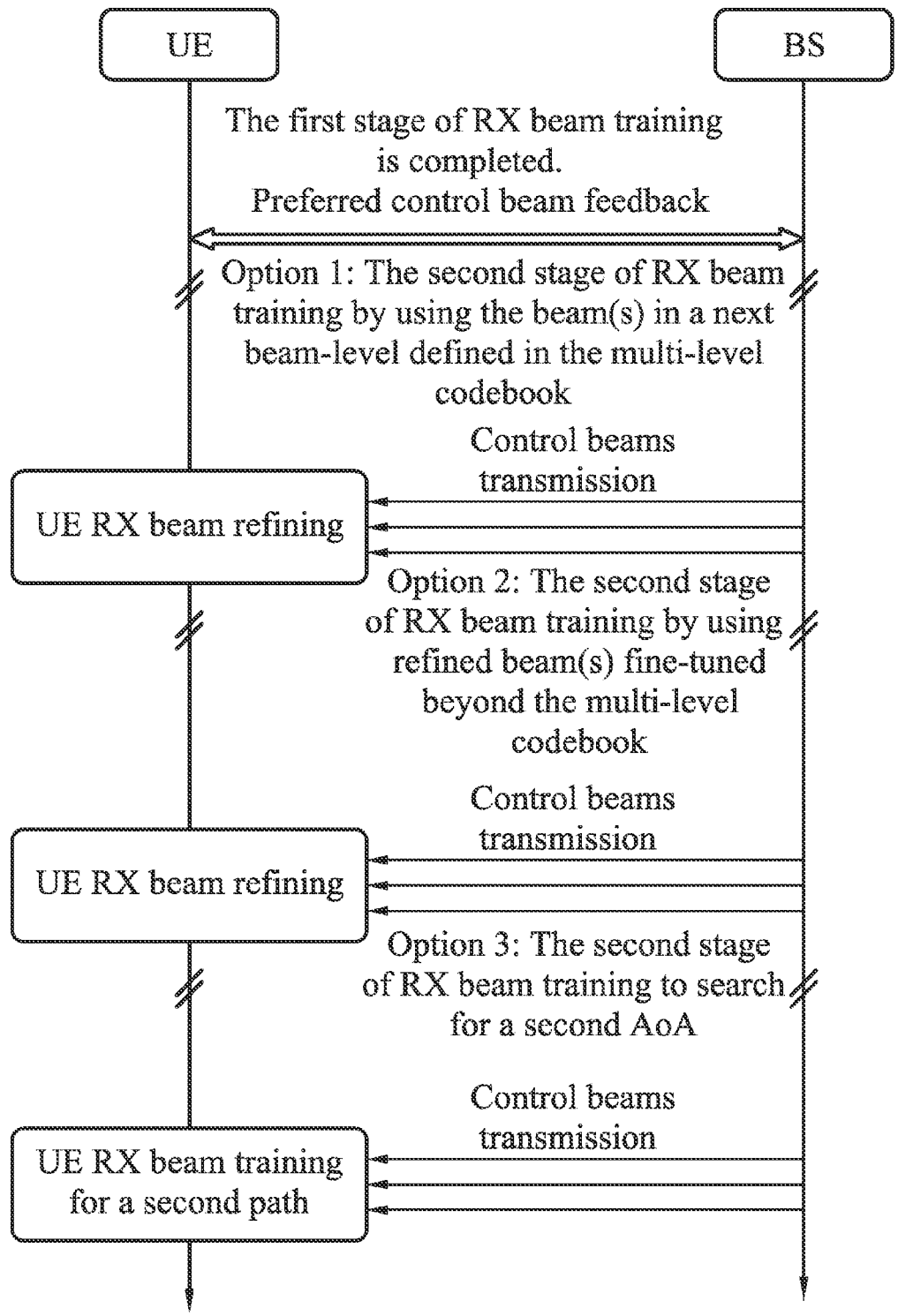
FIG. 13 is an exemplary flow chart showing the operations of the UE and the BS according to the fourth embodiment of the invention.

FIG. 13 is an exemplary flow chart showing the operations of the UE and the BS according to the fourth embodiment of the invention. The UE may complete a first stage of beam training to determine a preferred control beam and a preferred receiving beam for the first stage of beam training, and feedback the preferred control beam to the BS. Next, in the fourth embodiment of the invention, there may be three options for the UE to go further for a second stage of beam training. For option 1, the UE may select the beam(s) in a next beam level defined in the multi-level codebook with finer beam resolution to perform the second stage of beam training. For option 2, the UE may fine tune the pointing direction of the preferred RX beam determined in the first stage of beam training beyond the multi-level codebook and use the refined beam(s) to perform the second stage of beam training. For option 3, the UE may perform the second stage of beam training to search for a second AoA.

Note that in the fourth embodiment of the invention, the hierarchical beam training is achieved at the UE side based on or beyond multi-level codebook. The UE may train the RX beams at different beam levels with the beam resolutions increased in an ascending manner or may train the refined RX beams obtained by fine tuning the pointing direction of the preferred RX beam or may train another AoA as illustrated above, until a satisfactory array gain and/or a satisfactory correlation is obtained.

In a second aspect of the invention, the network control device (such as an eNB, BS, or the likes) may also perform multi-level TX/RX beam training after receiving the preferred control beam feedback from the communications apparatus (such as an UE under its coverage).

Figure 14:
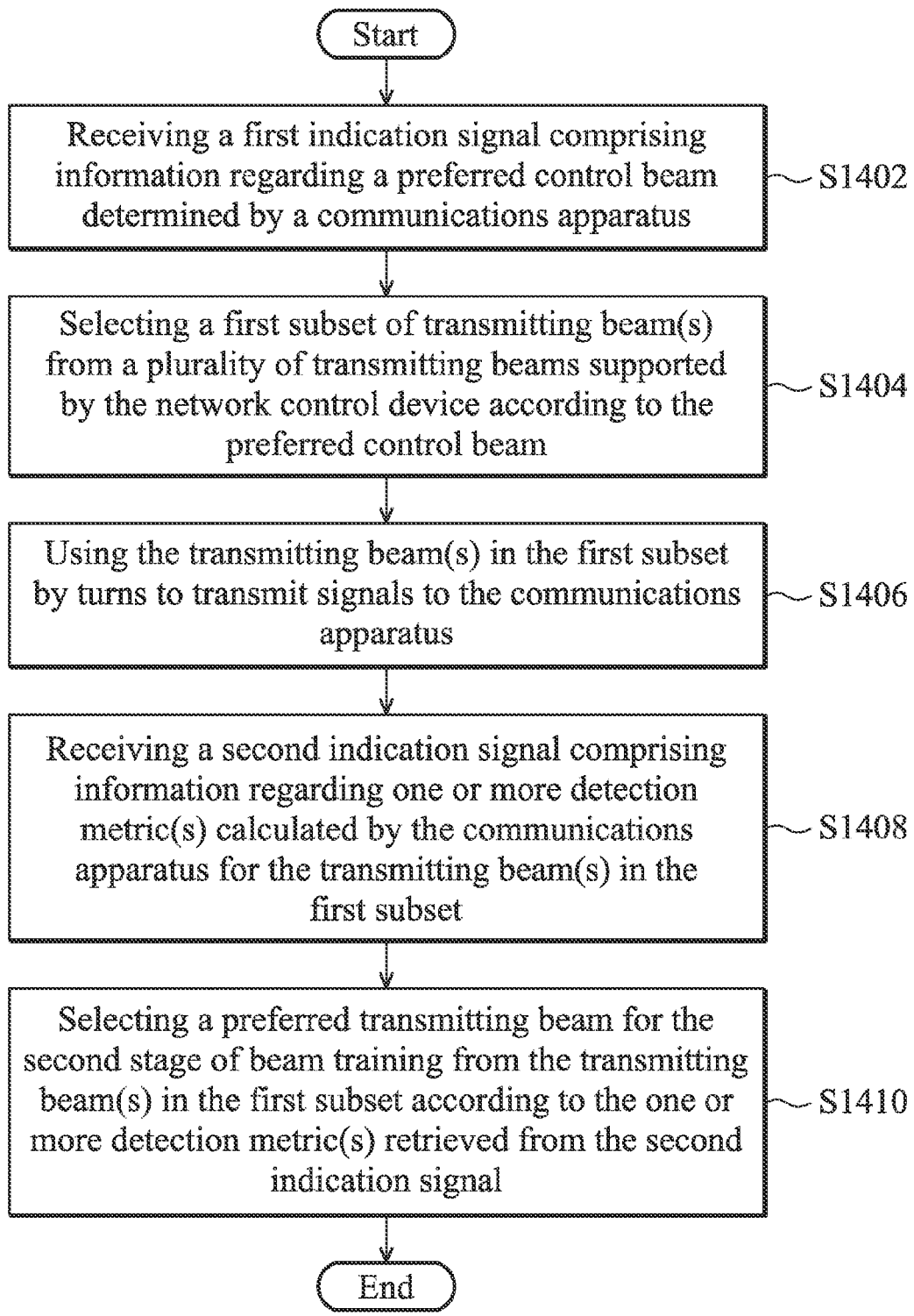
FIG. 14 is a flow chart of a method for efficient beam training according to the second aspect of the invention.

FIG. 14 is a flow chart of a method for efficient beam training according to the second aspect of the invention. The network control device may first receive a first indication signal comprising information regarding a preferred control beam determined by a communications apparatus for a first stage of beam training (Step S1402). Next, the network control device may select a first subset of transmitting beam(s) from a plurality of transmitting beams supported by the network control device according to the preferred control beam determined by the communications apparatus (Step S1404). According to an embodiment of the invention, at least one of the transmitting beam(s) comprised in the first subset associates with the preferred control beam.

Next, the network control device may use the transmitting beam(s) in the first subset in turn to transmit signals to the communications apparatus for a second stage of beam training (Step S1406). Next, the network control device may receive a second indication signal comprising information regarding one or more detection metric(s) calculated by the communications apparatus for the transmitting beam(s) in the first subset (Step S1408). Finally, the network control device may select a preferred transmitting beam for the second stage of beam training from the transmitting beam(s) in the first subset according to one or more detection metric(s) retrieved from the second indication signal (Step S1410).

According to a fifth embodiment of the invention, after receiving the first indication signal comprising information regarding the preferred control beam determined by the communications apparatus for the first stage of beam training, the controller of the network control device may select a first subset of transmitting beam(s) from a plurality of transmitting beams supported by the wireless communications module of the network control device according to the preferred control beam.

As discussed above, in the preferred embodiment of the invention, at least one of the transmitting beam(s) comprised in the first subset associates with the preferred control beam. The transmitting beams associating with the preferred control beam may have a beam main pattern that is overlapped with the beam main pattern of the preferred control beam. The transmitting beams associating with the preferred control beam may have a beam width narrower than the beam width of the preferred control beam. Note that, in some embodiments of the invention, the BS may also select the first subset of transmitting beam(s) by fine-tuning the direction, angle, and/or beam width of the preferred control beam beyond the multi-level codebook to generate one or more refined transmitting beam(s) as the transmitting beam(s) in the first subset.

The wireless communications module may use the transmitting beam(s) in the first subset in turn to transmit signals to the communications apparatus for a second stage of beam training. The wireless communications module may further receive a second indication signal comprising information regarding one or more detection metric(s) calculated by the communications apparatus for the transmitting beam(s) in the first subset. The controller may select a first preferred transmitting beam for the second stage of beam training from the transmitting beam(s) in the first subset according to the one or more detection metric(s) retrieved from the second indication signal. After first preferred transmitting beam is determined, the controller may transmit data to the communications apparatus via the first preferred transmitting beam.

In addition, in some embodiments of the invention, the network control device may start another beam training procedure to search for a second Angle of Departure (AoD), where the preferred transmitting beam determined in a previous beam training procedure is regarded as the first AoD. To be more specific, in some embodiments of the invention, when the second stage of beam training as discussed above is completed, the controller may further select a second subset of transmitting beam(s) from the plurality of transmitting beams supported by the wireless communications module. The wireless communications module may use the transmitting beam(s) in the second subset in turn to transmit signals transmitted to the communications apparatus for a third stage of beam training, and receive a third indication signal comprising information regarding one or more detection metric(s) calculated by the communications apparatus for the transmitting beam(s) in the second subset.

The controller may further select a second preferred transmitting beam for the third stage of beam training from the transmitting beam(s) in the second subset according to the one or more detection metric(s) retrieved from the third indication signal as the second AoD. In the embodiments of the invention, the controller may further determine to use the first preferred transmitting beam or the second preferred transmitting beam (or both of them) for subsequent data transmission.

Figure 15:
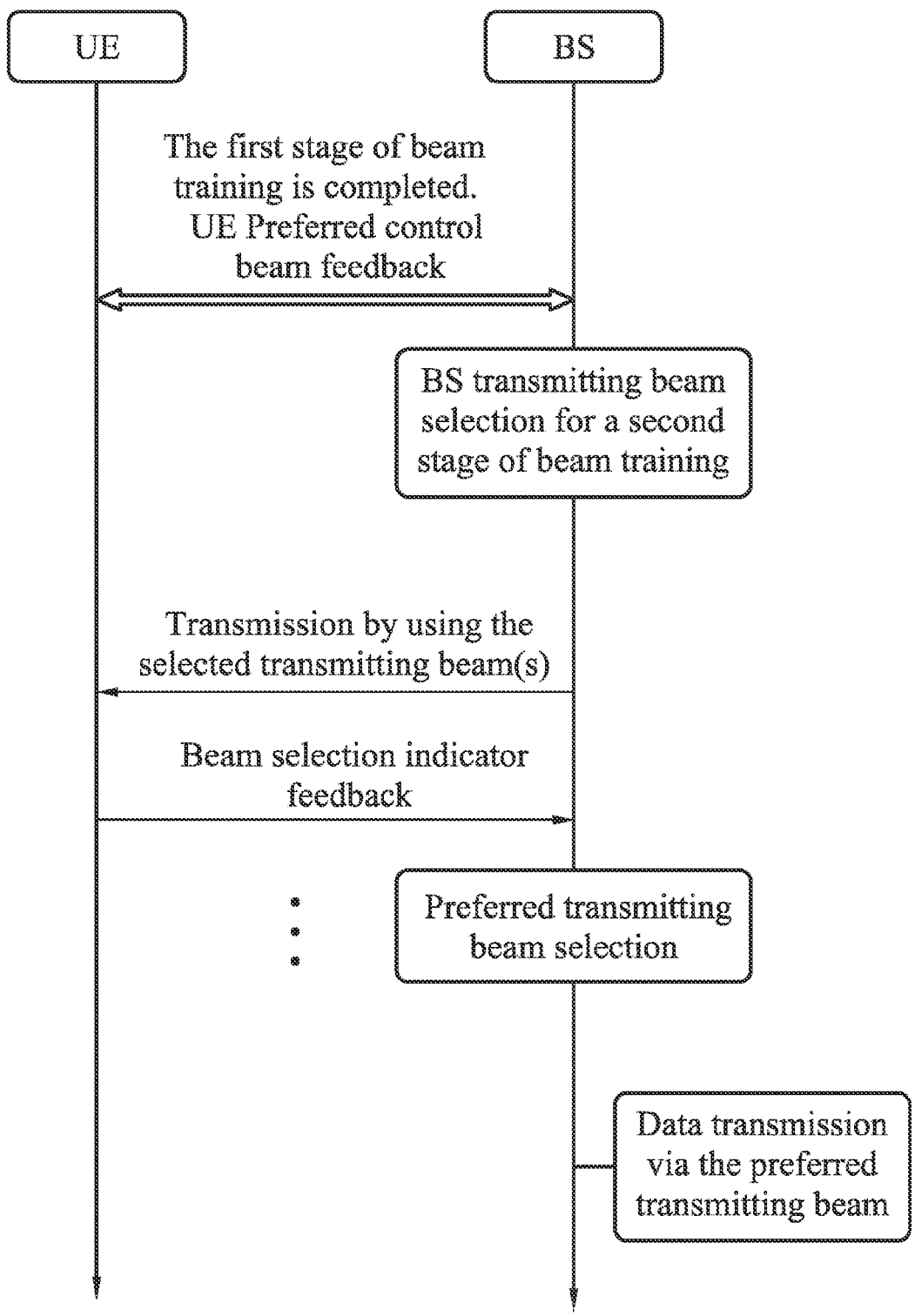
FIG. 15 is an exemplary flow chart showing the operations of the UE and the BS according to the fifth embodiment of the invention.

FIG. 15 is an exemplary flow chart showing the operations of the UE and the BS according to the fifth embodiment of the invention. The UE may complete a first stage of beam training to determine a preferred control beam and a preferred receiving beam for the first stage of beam training, and feed the preferred control beam back to the BS. Next, in the fifth embodiment of the invention, the BS may select a first subset of transmitting beam(s) according to the preferred control beam for a second stage of beam training, and the BS may perform signal transmission by using the selected transmitting beam(s). In the embodiments of the invention, the resources (for example, time and frequency) used for the selected transmitting beam(s) in the first subset may be signaled to the UE beforehand by, for example, the preferred control beam. Therefore, the UE knows when and how to receive the signals transmitted by the selected transmitting beam(s).

After receiving the signals transmitted by the selected transmitting beam(s), the UE may feedback the detection metric(s) calculated for the transmitting beam(s) as a beam selection indicator to the BS. The BS may then select a preferred transmitting beam for the second stage of beam training based on the beam selection indicator. After the preferred transmitting beam is determined, the BS may transmit data to the UE via the preferred transmitting beam. Note that several rounds of the beam training procedure may further be performed for the TX beams in the beam level(s) with even finer resolution until a satisfactory array gain and/or a satisfactory correlation is obtained.

Note further that in the fifth embodiment of the invention, the hierarchical beam training is achieved at the BS side based on or beyond multi-level codebook. The BS may train the TX beams in different beam levels with the beam resolutions increased in an ascending manner or may train the refined TX beams obtained by fine tuning the preferred control beam as illustrated above, until a satisfactory array gain and/or a satisfactory correlation is obtained.

According to a sixth embodiment of the invention, the first indication signal received from the communications apparatus for indicating the preferred control beam is used by the network control device for Direction of Arrival (DoA) estimation. The selection of the transmitting beam(s) in the first subset as discussed above in the fifth embodiment may be made by the network control device based on the DoA estimation.

To be more specific, in the sixth embodiment of the invention, the controller may perform a Direction of Arrival (DoA) estimation according to the first indication signal received from the communications apparatus, and determine an appropriate beam resolution or an appropriate adjustment unit for direction, angle, and/or beam width refinement based on a DoA resolution. The appropriate beam resolution and appropriate adjustment unit are utilized for selecting/generating the transmitting beam(s) in the first subset as discussed in the fifth embodiment. In the embodiments of the invention, the DoA resolution is dependent on a number of transceiver chains comprised in the wireless communications module of the network control device. For example, suppose that there are 10 transceiver chains comprised in the network control device to cover an angle of 90 degrees, the DoA resolution may be determined as 9 degrees and the appropriate beam resolution or the appropriate adjustment unit may be determined to be not less than 9 degrees. Preferably, the appropriate beam resolution determined based on the DoA resolution is finer than a beam resolution of the control beams.

Next, the controller may select one or more transmitting beam(s) from a predefined codebook according to the appropriate beam resolution as the transmitting beam(s) in the first subset, or fine tune a direction, angle, and/or beam width of the preferred control beam according to the appropriate adjustment unit to generate one or more refined transmitting beam(s) as the transmitting beam(s) in the first subset, and further direct the wireless communications module to use the transmitting beam(s) in the first subset in turn to transmit the signals to the communications apparatus for the second stage of beam training as discussed above in the fifth embodiment.

Figure 16:
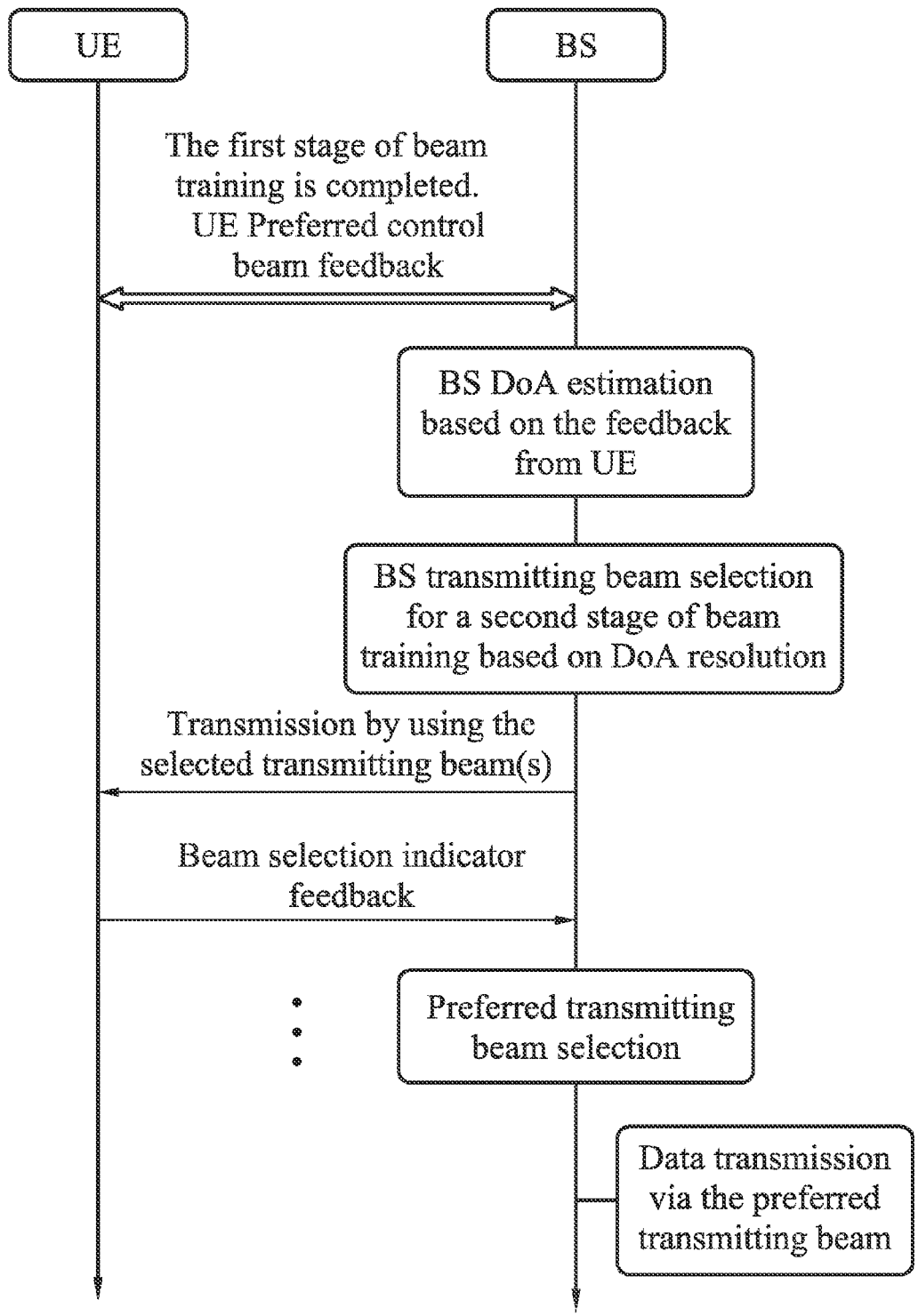
FIG. 16 is an exemplary flow chart showing the operations of the UE and the BS according to the sixth embodiment of the invention.

FIG. 16 is an exemplary flow chart showing the operations of the UE and the BS according to the sixth embodiment of the invention. The UE may complete a first stage of beam training to determine a preferred control beam and a preferred receiving beam for the first stage of beam training, and feedback the preferred control beam to the BS. Next, in the sixth embodiment of the invention, the BS may perform DoA estimation based on the feedback received from UE and then select a first subset of transmitting beam(s) for a second stage of beam training based on the DoA resolution. Note that in the embodiments of the invention, the selected transmitting beam(s) preferably associate(s) with the preferred control beam.

The BS may then perform signal transmission by using the selected transmitting beam(s). In the embodiments of the invention, the resources (for example, time and frequency) used by the selected transmitting beam(s) in the first subset may be signaled to the UE beforehand by, for example, the preferred control beam. Therefore, the UE knows when and how to receive the signals transmitted by the selected transmitting beam(s).

After receiving the signals transmitted by the selected transmitting beam(s), the UE may feedback the detection metric(s) calculated for the transmitting beam(s) as a beam selection indicator to the BS. The BS may then select a preferred transmitting beam for the second stage of beam training based on the beam selection indicator. After a preferred transmitting beam is determined, the BS may transmit data to the UE via the preferred transmitting beam. Note that the beam training procedure may further be performed in several rounds for the TX beams in the beam level(s) with even finer resolution until a satisfactory array gain and/or a satisfactory correlation is obtained.

Note further that in the sixth embodiment of the invention, the hierarchical beam training is achieved at the BS side based on or beyond multi-level codebook. The BS may perform DoA estimation and select the TX beams to be trained based on the DoA resolution as illustrated above. The BS may then train the selected TX beams until a satisfactory array gain and/or a satisfactory correlation is obtained.

In a third aspect of the invention, when the preferred control beam and the preferred receiving beam are determined, the communications apparatus (such as an UE) may further perform beam maintenance by continuing to monitor some other beams. In case one beam is detected to exhibit a better detection metric than the preferred control beam or the preferred receiving beam, the communications apparatus may determine to change the preferred control beam or the preferred receiving beam.

Figure 17:
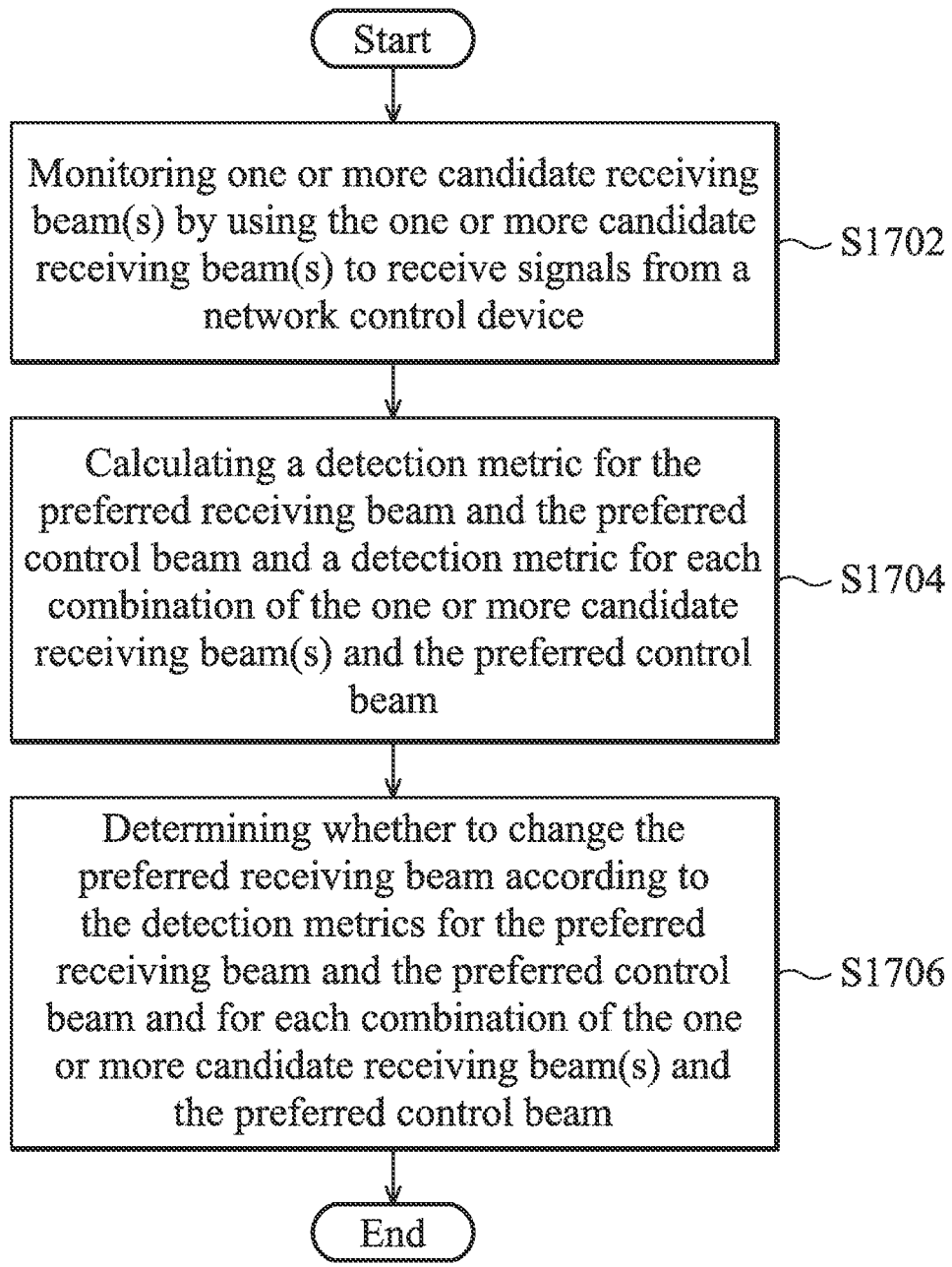
FIG. 17 is a flow chart of a method for efficient beam training according to the third aspect of the invention.

FIG. 17 is a flow chart of a method for efficient beam training according to the third aspect of the invention. The communications apparatus may first monitor one or more candidate receiving beam(s) by using the one or more candidate receiving beam(s) to receive signals from a network control device (Step S1702). In the embodiments of the invention, the signals are transmitted by the network control device by using a preferred control beam determined by the communications apparatus, and the communications apparatus uses a preferred receiving beam determined in a beam training procedure to communicate with the network control device. Next, the communications apparatus may calculate a detection metric for the preferred receiving beam and the preferred control beam and a detection metric for each combination of the one or more candidate receiving beam(s) and the preferred control beam (Step S1704). Next, the communications apparatus may determine whether to change the preferred receiving beam according to the detection metrics for the preferred receiving beam and the preferred control beam and for each combination of the one or more candidate receiving beam(s) and the preferred control beam (Step S1706).

To be more specific, according to a seventh embodiment of the invention, the wireless communications module of the communications apparatus may use a preferred receiving beam determined in a beam training procedure to communicate with the network control device and further monitor one or more candidate receiving beam(s) by using the one or more candidate receiving beam(s) to receive signals from the network control device. The wireless communications module may use the candidate receiving beam(s) to receive the signals transmitted by the network control device by using a preferred control beam determined in the beam training procedure. The controller of the communications apparatus may calculate a detection metric for the preferred receiving beam and the preferred control beam and a detection metric for each combination of the one or more candidate receiving beam(s) and the preferred control beam and determine whether to change the preferred receiving beam according to the detection metrics for the preferred receiving beam and the preferred control beam and for each combination of the one or more candidate receiving beam(s) and the preferred control beam.

According to an embodiment of the invention, the one or more candidate receiving beam(s) may be the neighboring receiving beam(s) of the preferred receiving beam. In addition, in some embodiments of the invention, the one or more candidate receiving beam(s) and the preferred receiving beam may belong to the same beam level. In addition, in yet some embodiments of the invention, the one or more candidate receiving beam(s) and the preferred receiving beam may have the same beam resolution. In addition, in still some embodiments of the invention, the one or more candidate receiving beam(s) and the preferred receiving beam may have the same beam width.

Figure 18A:
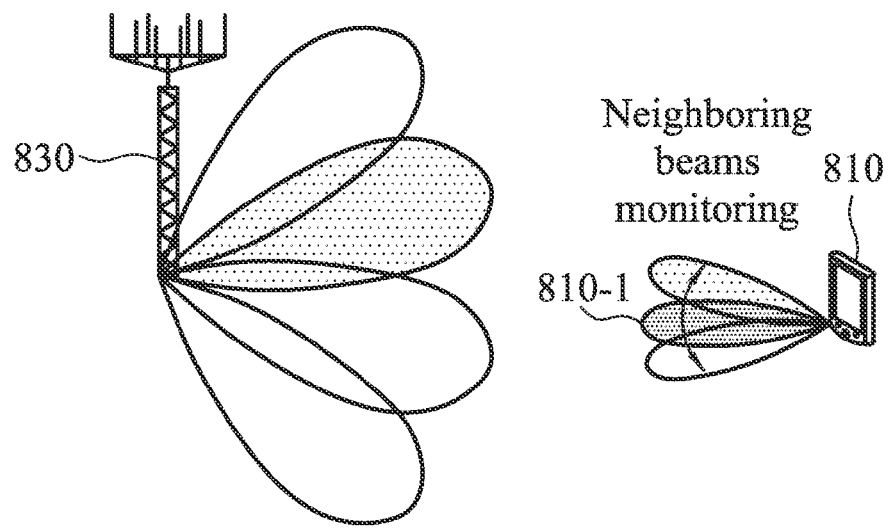
FIG. 18A is a schematic diagram showing the exemplary beams of the network control device and the communications apparatus according to an embodiment of the invention.

FIG. 18A is a schematic diagram showing the exemplary beams of the network control device and the communications apparatus according to an embodiment of the invention. As shown in FIG. 18A, the network control device 830 may be an eNB or a BS, and may be capable of generating a plurality of beams with different orientations and/or directions (angles). The communications apparatuses 810 may be the UEs and may monitor the neighboring beam(s) of the preferred receiving beam 810-1.

According to another embodiment of the invention, when the communications apparatus has detected a degraded channel quality (for example, degraded SINR) with the current beam, the communications apparatus may further determine to fall back and use a beam with a coarser beam resolution for communication. The current SINR1 obtained by using the current TX (network control device side) and RX (communications apparatus side) beam should be compared with the SINR2 obtained by using the current TX and fallback RX beam. Since fallback RX beam has coarser resolution and provides less array gain, one would SINR1>SINR2. If SINR1 is merely comparable with SINR2, fallback can take place.

Figure 18B:
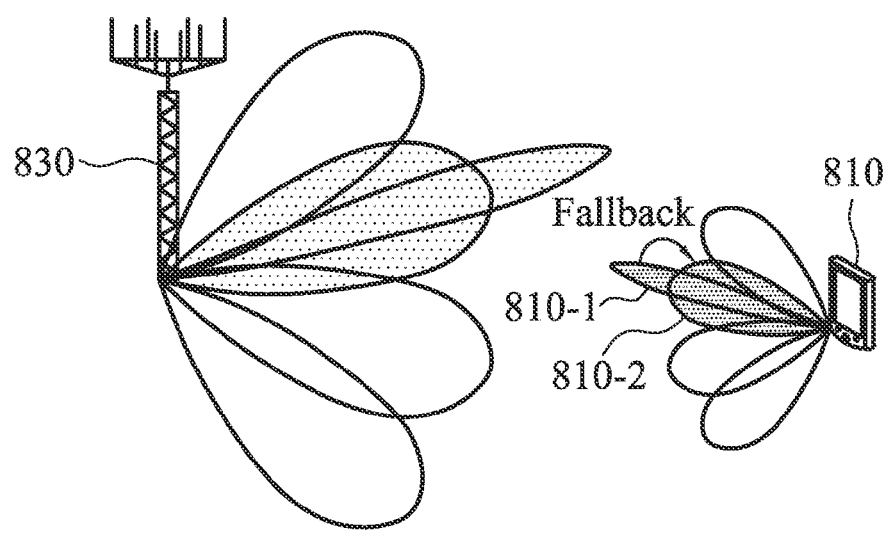
FIG. 18B is a schematic diagram showing the exemplary beams of the network control device and the communications apparatus according to another embodiment of the invention.

FIG. 18B is a schematic diagram showing the exemplary beams of the network control device and the communications apparatus according to another embodiment of the invention. As shown in FIG. 18B, the communications apparatuses 810 may change from the preferred receiving beam 810-1 to the beam 810-2 with a coarser beam resolution.

Therefore, in some embodiments of the invention, the one or more candidate receiving beam(s) monitored by the communications apparatus and the preferred receiving beam of the communications apparatus may belong to different beam levels. In addition, in some embodiments of the invention, the beam resolution of the one or more candidate receiving beam(s) may be coarser than the beam resolution of the preferred receiving beam. In addition, in other embodiments of the invention, the beam width of the one or more candidate receiving beam(s) may be wider than the beam width of the preferred receiving beam. Note that, in the embodiments of the invention, the one or more candidate receiving beam(s) is/are not necessarily associated with the current preferred receiving beam.

According to yet another embodiment of the invention, the communications apparatus may further monitor a plurality of control beams of the network control device by using a subset of receiving beam(s) in turn to receive signals transmitted by the network control device. The controller of the communications apparatus may further calculate a detection metric for each combination of the receiving beam(s) in the subset and the control beams, and determine whether to change the preferred control beam according to the detection metrics for the combinations of the receiving beam(s) in the subset and the control beams. When the controller determines to change the preferred control beam, the controller further determines a new preferred control beam to replace the preferred control beam, and the wireless communications module further transmits an indication signal comprising information regarding the new preferred control beam to the network control device at an uplink opportunity corresponding to the old preferred control beam. Note that in the embodiments of the invention, once the preferred control beam changes, the subsequent beam training as discussed in different embodiments above may also be performed by the communications apparatus and the network control device based on the new preferred control beam.

Figure 18C:
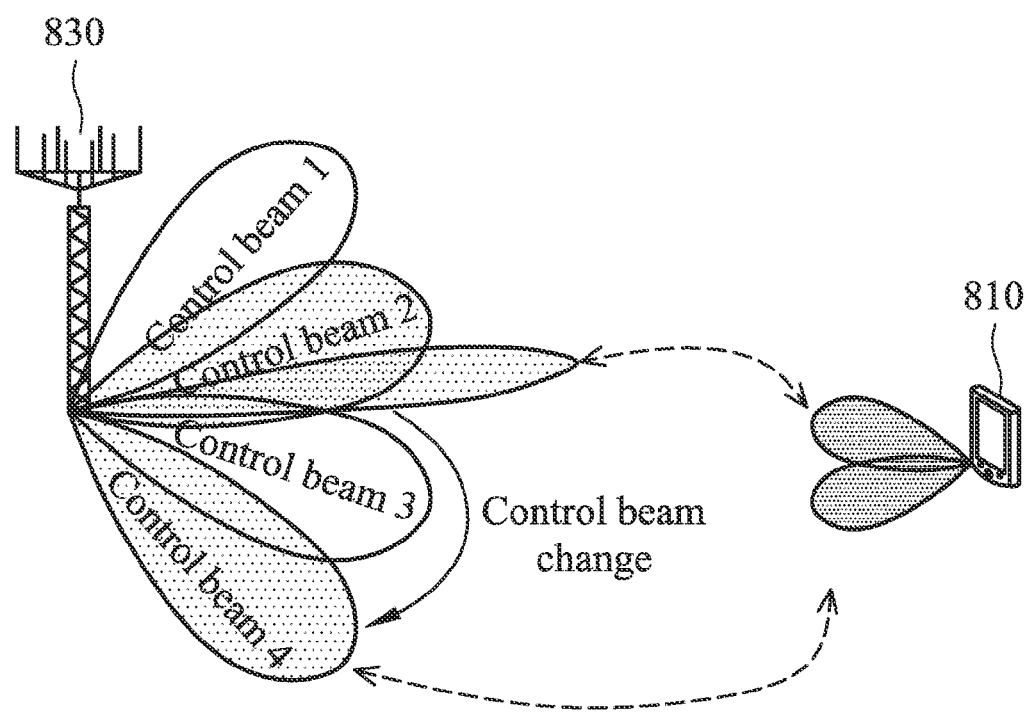
FIG. 18C is a schematic diagram showing the exemplary beams of the network control device and the communications apparatus according to yet another embodiment of the invention.

FIG. 18C is a schematic diagram showing the exemplary beams of the network control device and the communications apparatus according to yet another embodiment of the invention. As shown in FIG. 18C, the communications apparatuses 810 may keep monitoring the control beams and may determine the need to change the preferred control beam from control beam 2 to control beam 4 based on the channel quality revealed by the calculated detection metrics.

In a fourth aspect of the invention, when the preferred control beam and the preferred receiving beam are determined, the network control device (such as an eNB, BS, or the like) may also perform beam maintenance by continuing to train some other beams. In case one beam is detected to be exhibiting a better detection metric than the preferred control beam or the preferred transmitting beam, the network control device may determine to change the preferred control beam or the preferred transmitting beam.

Figure 19:
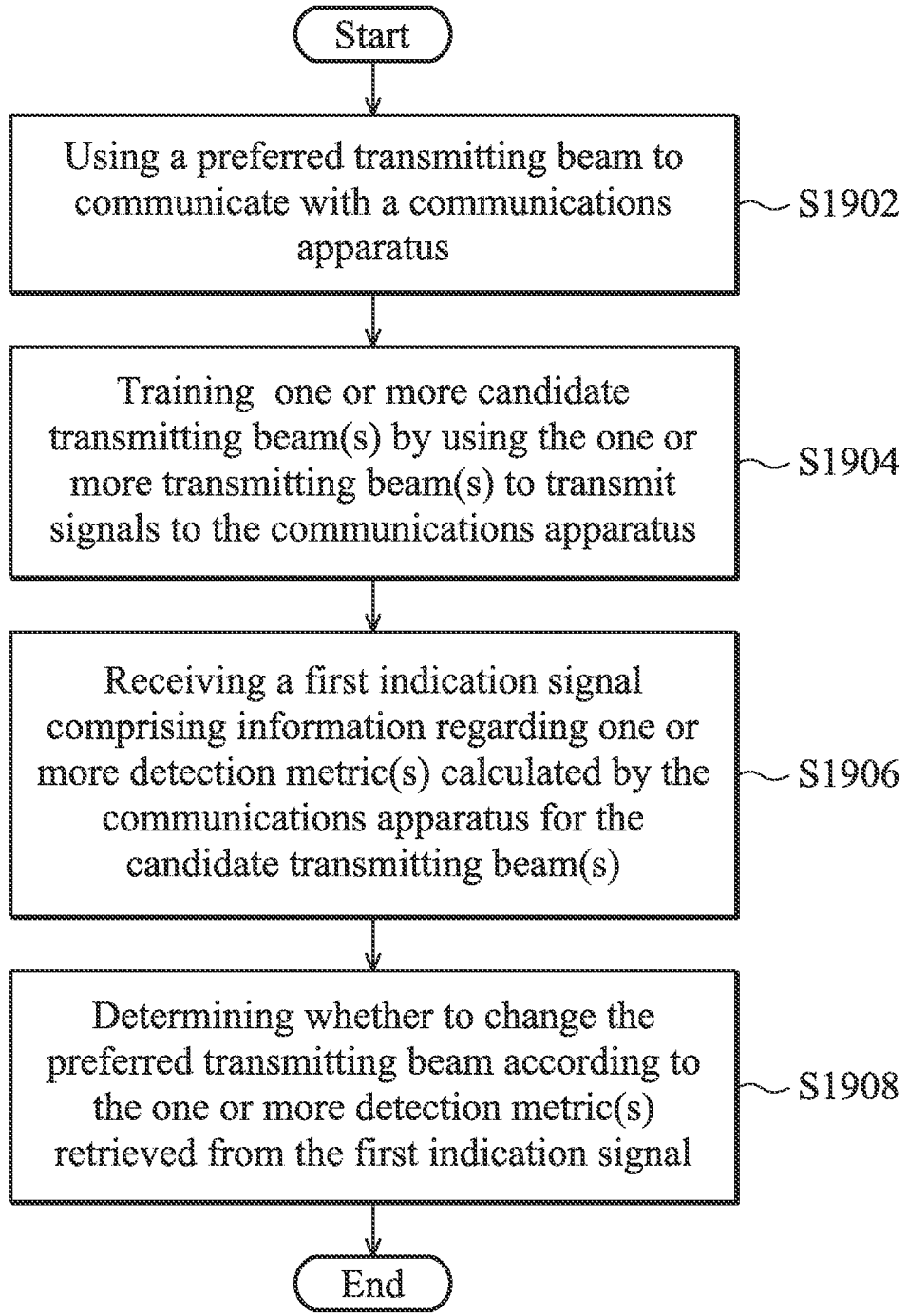
FIG. 19 is a flow chart of a method for efficient beam training according to the fourth aspect of the invention.

FIG. 19 is a flow chart of a method for efficient beam training according to the fourth aspect of the invention. First of all, the network control device may use a preferred transmitting beam to communicate with a communications apparatus (such as an UE under its coverage) (Step S1902). Next, the network control device may keep training one or more candidate transmitting beam(s) by using the one or more transmitting beam(s) to transmit signals to the communications apparatus (Step S1904). Next, the network control device may receive a first indication signal comprising information regarding one or more detection metric(s) calculated by the communications apparatus for the candidate transmitting beam(s) (Step S1906). Finally, the network control device may determine whether to change the preferred transmitting beam according to the one or more detection metric(s) retrieved from the first indication signal (Step S1908).

According to an embodiment of the invention, the one or more candidate transmitting beam(s) may be the neighboring transmitting beam(s) of the preferred transmitting beam. In addition, in some embodiments of the invention, the one or more candidate transmitting beam(s) and the preferred transmitting beam may belong to the same beam level. In addition, in yet some embodiments of the invention, the one or more candidate transmitting beam(s) and the preferred transmitting beam may have the same beam resolution. In addition, in still some embodiments of the invention, the one or more candidate transmitting beam(s) and the preferred transmitting beam may have the same beam width.

Figure 20A:
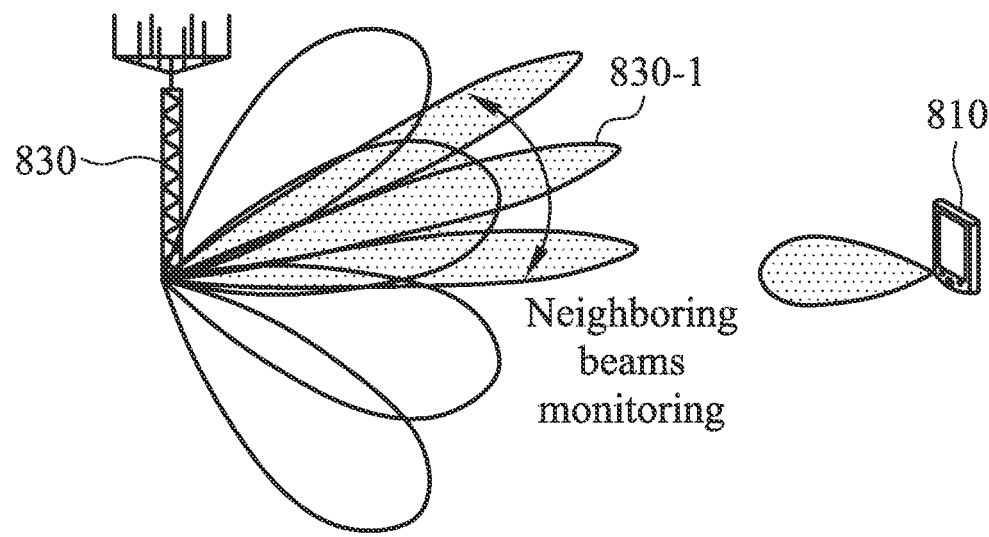
FIG. 20A is a schematic diagram showing the exemplary beams of the network control device and the communications apparatus according to an embodiment of the invention.

FIG. 20A is a schematic diagram showing the exemplary beams of the network control device and the communications apparatus according to an embodiment of the invention. As shown in FIG. 20A, the network control device 830 may be an eNB or a BS, and may be capable of generating a plurality of beams with different orientations and/or directing to different directions (angles). The network control device 830 may keep training the neighboring beam(s) of the preferred transmitting beam 830-1 which is currently utilized to communicate with the communications apparatuses 810.

Figure 21:
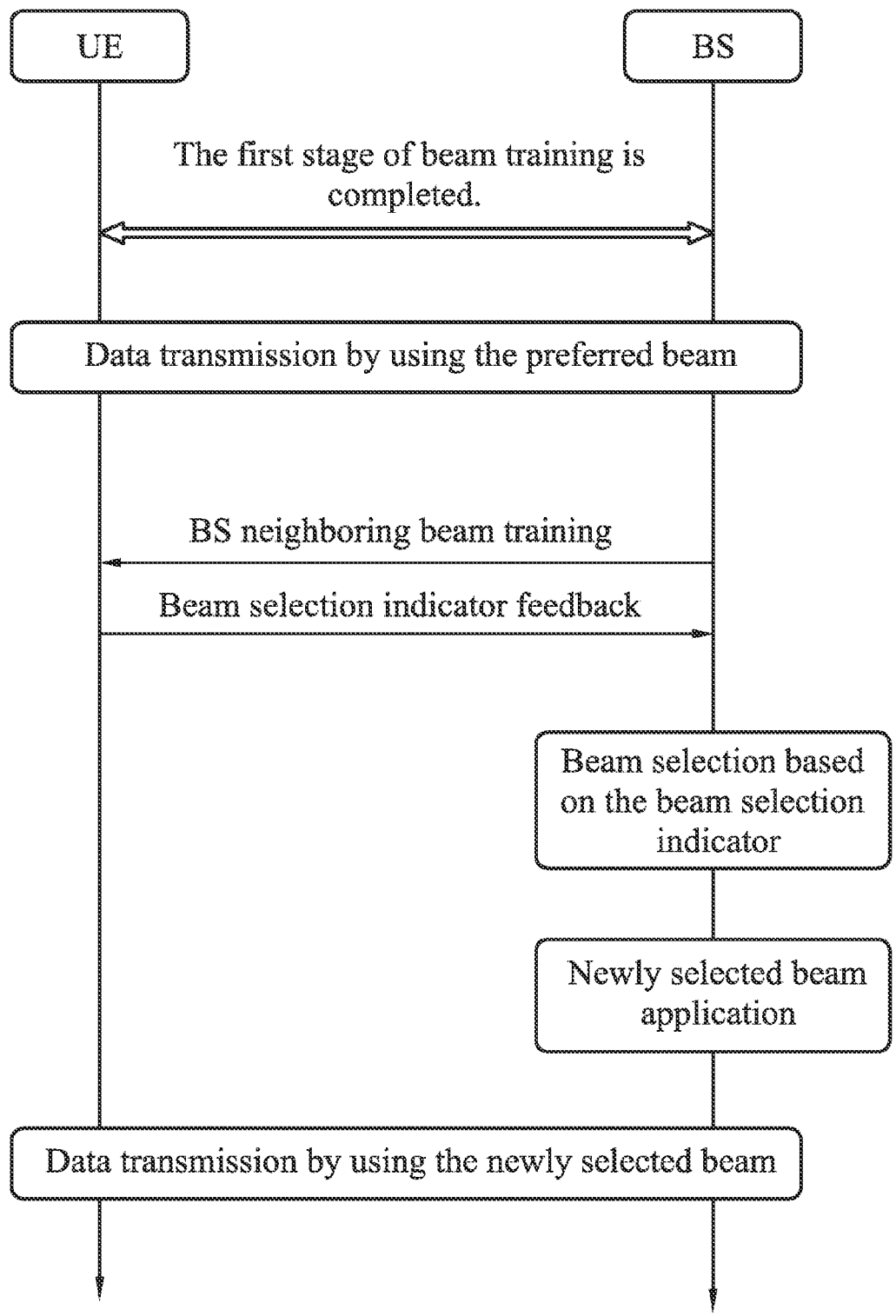
FIG. 21 is an exemplary flow chart showing the operations of the UE and the BS according to an eighth embodiment of the invention.

FIG. 21 is an exemplary flow chart showing the operations of the UE and the BS according to an eighth embodiment of the invention. After a first stage of beam training is completed, the UE and BS may begin data transmission by using the preferred beams. Next, in the eighth embodiment of the invention, the BS may keep training the neighboring beam(s) of the preferred beams. After receiving the signals transmitted by the BS via the neighboring beam(s), the UE may feedback the detection metric(s) calculated for the neighboring beam(s) as a beam selection indicator to the BS. The BS may then select a better beam based on the beam selection indicator, and apply the newly selected beam. Then, the UE and BS may begin data transmission by using the newly selected beam.

Figure 20B:
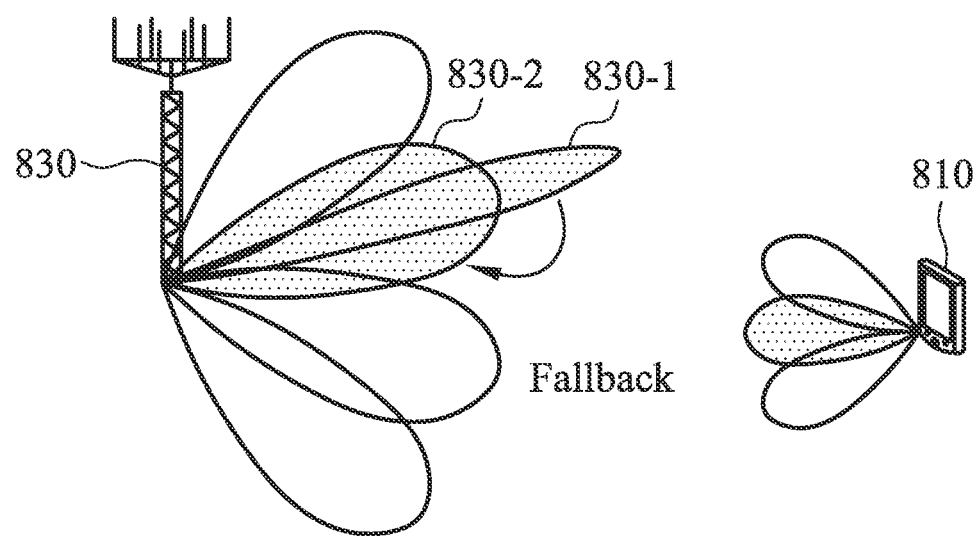
FIG. 20B is a schematic diagram showing the exemplary beams of the network control device and the communications apparatus according to another embodiment of the invention.

According to another embodiment of the invention, when the network control device has detected degraded channel quality with the current beam, the network control device may further determine to fall back and use a beam with a coarser beam resolution for communication. FIG. 20B is a schematic diagram showing the exemplary beams of the network control device and the communications apparatus according to another embodiment of the invention. As shown in FIG. 20B, the network control device 830 may fall the preferred receiving beam 830-1 back to the beam 830-2 with a coarser beam resolution.

Therefore, in some embodiments of the invention, the one or more candidate transmitting beam(s) and the preferred transmitting beam in the fourth aspect of the invention may belong to different beam levels. In addition, in yet some embodiments of the invention, a beam resolution of the one or more candidate transmitting beam(s) may be coarser than a beam resolution of the preferred transmitting beam. In addition, in still some embodiments of the invention, a beam width of the one or more candidate transmitting beam(s) may be wider than a beam width of the preferred transmitting beam. Note that in the embodiments of the invention, the one or more candidate transmitting beam(s) is/are not necessarily associated with the current preferred transmitting beam.

Figure 20C:
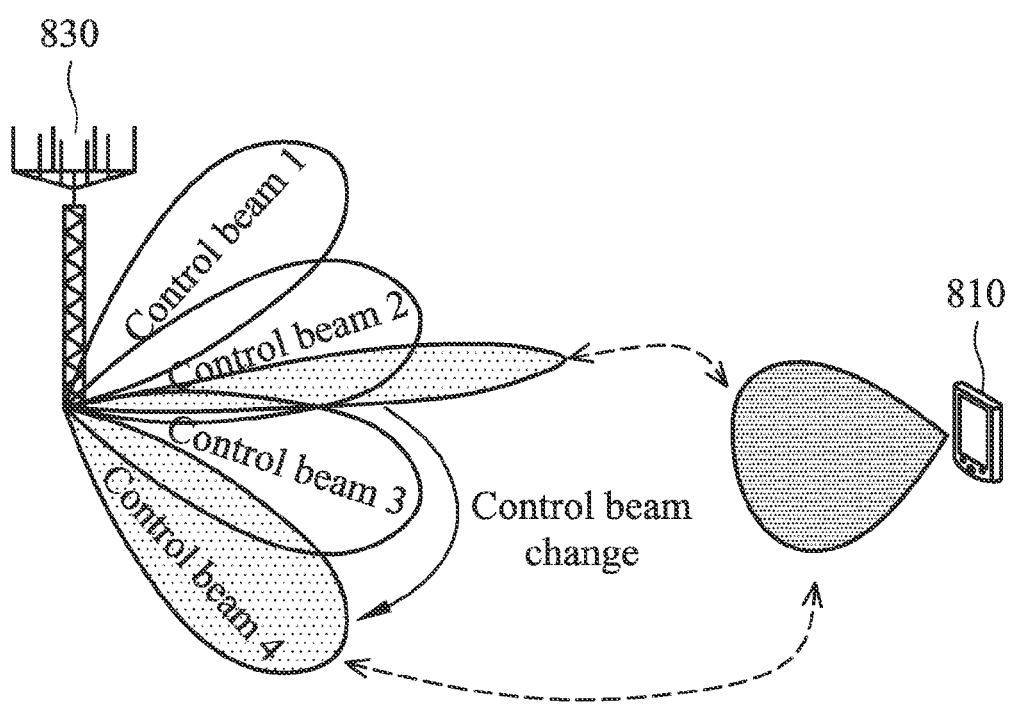
FIG. 20C is a schematic diagram showing the exemplary beams of the network control device and the communications apparatus according to yet another embodiment of the invention.

According to yet another embodiment of the invention, the one or more candidate transmitting beam(s) in the fourth aspect of the invention may also be the control beam(s). FIG. 20C is a schematic diagram showing the exemplary beams of the network control device and the communications apparatus according to yet another embodiment of the invention. As shown in FIG. 20C, the communications apparatuses 810 may keep monitoring the control beams and may determine to change the preferred control beam from control beam 2 to control beam 4 based on the channel quality revealed by the calculated detection metrics.

To be more specific, the network control device may keep transmitting signals via the control beams. The communications apparatus may monitor the control beams of the network control device by using a subset of receiving beam(s) in turn to receive signals transmitted by the network control device as discussed above. When the communications apparatus determines to change the preferred control beam as shown in FIG. 20C, the communications apparatus may further determine a new preferred control beam to replace the preferred control beam and feedback the new preferred control beam to the network control device.

Therefore, the wireless communications module of the network control device may receive a second indication signal comprising information regarding the new preferred control beam from the communications apparatus. The controller of the network control device may determine whether the new preferred control beam is the same as a previous preferred control beam determined by the communications apparatus in a previous beam training procedure. When the controller determines that the new preferred control beam is different from the previous preferred control beam, the controller may determine to start a new beam training procedure by selecting a subset of transmitting beam(s) associating with the new preferred control beam from a plurality of transmitting beams supported by the wireless communications module and direct the wireless communications module to use the transmitting beam(s) in the subset in turn to transmit signals to the communications apparatus for the new beam training procedure as discussed in different embodiments above.

For example, the wireless communications module may further receive a third indication signal comprising information regarding one or more detection metric(s) calculated by the communications apparatus for the transmitting beam(s) in the subset, and the controller may select a new preferred transmitting beam from the transmitting beam(s) in the subset according to one or more detection metric(s) retrieved from the third indication signal. After the new preferred transmitting beam is determined, the data transmission may begin.

Note that in the third and fourth aspects of the invention, the beam maintenance is achieved respectively at the UE and BS sides. In this manner, the UE and BS may be able to always use a proper beam for communication.

In a fifth aspect of the invention, the network control device (such as an eNB, BS, or the like) may provide at least one training gap in at least one downlink opportunity corresponding to a preferred transmitting beam determined by or determined for a communications apparatus (such as an UE) in a previous beam training procedure. Note that in the embodiments of the invention, one downlink opportunity may comprise a plurality of sub-frames. FIG. 8 may be referred to for details of the exemplary downlink opportunity of a transmitting beam of the network control device.

Because the communications apparatus may be a portable electronic device, the preferred receiving beam for communicating with the network control device may be changed over time. Therefore, after a previous beam training procedure is completed, the communications apparatus may still training all the receiving beams that it supports so that it can update the preferred receiving beam for communication. However, since the network control device may schedule dedicated data transmission for the communications apparatus in the downlink opportunity corresponding to the preferred transmitting beam, when the communications apparatus performs training by using an unsuitable receiving beam to receive the dedicated data, undesired data loss may occur.

Figure 22:
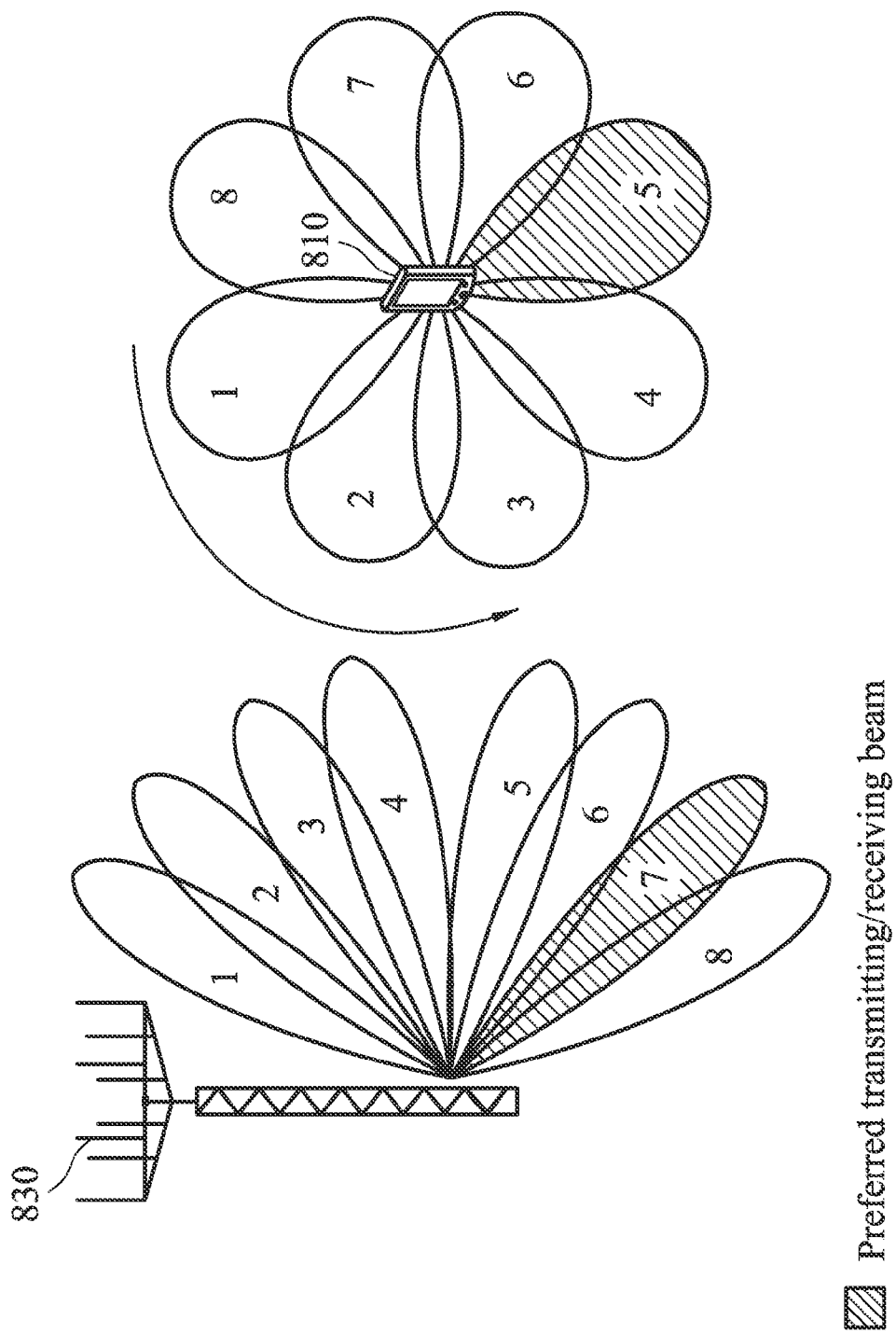
FIG. 22 shows an exemplary scenario according to a fifth aspect of the invention.

FIG. 22 shows an exemplary scenario according to a fifth aspect of the invention. Suppose that the network control device 830 supports 8 beams and the communications apparatus 810 supports 8 beams. The preferred transmitting beam of the network control device 830 determined a previous beam training procedure is the $7^{th}$ beam and the preferred receiving beam of the communications apparatus 810 determined a previous beam training procedure is the $5^{th}$ beam. When the communications apparatus performs beam training of the $8^{th}$ beam at the time the network control device 830 schedules dedicated data for the communications apparatus 810, undesired data loss may occur. This may happen after the communications apparatus camps on the network control device and the network control device knows how to establish a communication with the communications apparatus. For example, after a random access procedure of the communications apparatus to access the network of the network control device is completed or when the communications apparatus enters a RRC_connected state.

To solve this problem, the network control device may provide at least one training gap in at least one downlink opportunity corresponding to the preferred transmitting beam. According to an embodiment of the invention, in the training gap, the network control device does not schedule any dedicated data for the communications apparatus. With the knowledge of training gap, the communications apparatus may schedule beam training for any receiving beam that the communications apparatus supports but different from the preferred receiving beam in the training gap to avoid undesired data loss.

To be more specific, when the controller of the network control device schedules signal or data to be transmitted in at least one downlink opportunity corresponding to the preferred transmitting beam for a specific communications apparatus, the controller provides at least one training gap, in which the controller does not schedule any dedicated data to the specific communications apparatus, in the downlink opportunity corresponding to the preferred transmitting beam.

Regarding the communications apparatus, the controller of the communications apparatus may direct the wireless communications module to use a receiving beam other than the preferred receiving beam to receive the signals transmitted by the network control device in at least one training gap of the downlink opportunity corresponding to the preferred transmitting beam, and direct the wireless communications module to use the preferred receiving beam to receive signals or dedicated data transmitted by the network control device in the remaining time of the downlink opportunity corresponding to the preferred transmitting beam.

Figure 23:
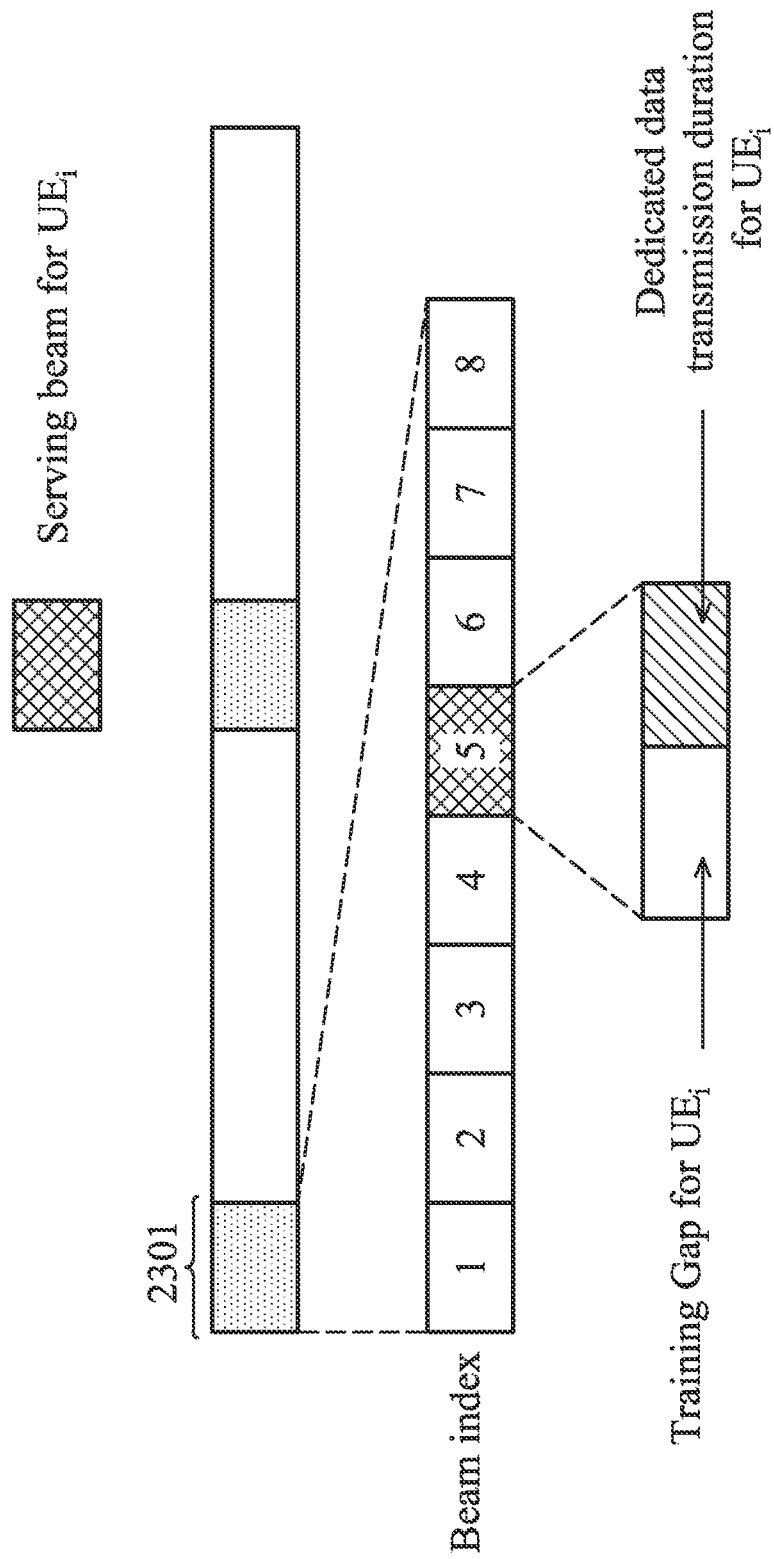
FIG. 23 is a schematic diagram showing the timing schedule of a network control device according to an embodiment of the invention.

FIG. 23 is a schematic diagram showing the timing schedule of a network control device according to an embodiment of the invention. As shown in FIG. 23, the period 2301 is utilized for downlink transmission. The block labeled with the number '1' during the period 2301 represents the downlink opportunity of the transmitting beam 1, the block labeled with the number '2' during the period 2301 represents the downlink opportunity of the transmitting beam 2, and so on.

In the scenario shown in FIG. 23, the $5^{th}$ beam is the preferred transmitting beam for communicating with the i-th communications apparatus $UE_i$ and may be regarded as a serving beam for $UE_i$. The network control device may provide at least one training gap for $UE_i$ in the downlink opportunity of the $5^{th}$ beam (the serving beam for $UE_i$), and may schedule dedicate data transmission for the i-th communications apparatus $UE_i$ in the remaining time (shown as the dedicated data transmission duration for $UE_i$) of the downlink opportunity of the $5^{th}$ beam. In other words, UE-specific transmission does not occupy the whole time span of its serving beam and only occupies part of the time span of its serving beam.

Note that although the gap interval shown in FIG. 23 locates in the former portion of the downlink opportunity corresponding to the preferred transmitting beam, the invention should not be limited thereto. The position of the provided gap interval is not limited to any specific position in the downlink opportunity. In addition, when more than one gap interval is provided in the downlink opportunity, the gap intervals may be continuous or discontinuous, and the invention is not limited to any specific case. In addition, the preferred transmitting beam with gap interval provided can be the transmitting beam in any beam level and is not limited to the control beam.

According to an embodiment of the invention, the position (or, the position and duration) of the training gap may be linked or mapped to the random access resources selected by the communications apparatus. In this embodiment, once the communications apparatus selects the random access resources, the position (or, the position and duration) of the training gap is/are also determined. In this manner, both the controller of the network control device and the controller of the communications apparatus may obtain information regarding the position (or, the position and duration) of the training gap according to random access resources selected by the communications apparatus. According to an embodiment of the invention, the random access resources may comprise a random access preamble and a physical random access channel (PRACH) resource.

According to another embodiment of the invention, the position (or, the position and duration) of the training gap may be linked or mapped to an identifier assigned by the network control device to communications apparatus after a random access procedure of the communications apparatus is completed. In this embodiment, once the identifier of communications apparatus is determined, the position (or, the position and duration) of the training gap is/are also determined. In this manner, both the controller of the network control device and the controller of the communications apparatus may obtain information regarding the position (or, the position and duration) of the training gap according to the identifier.

Figure 24:
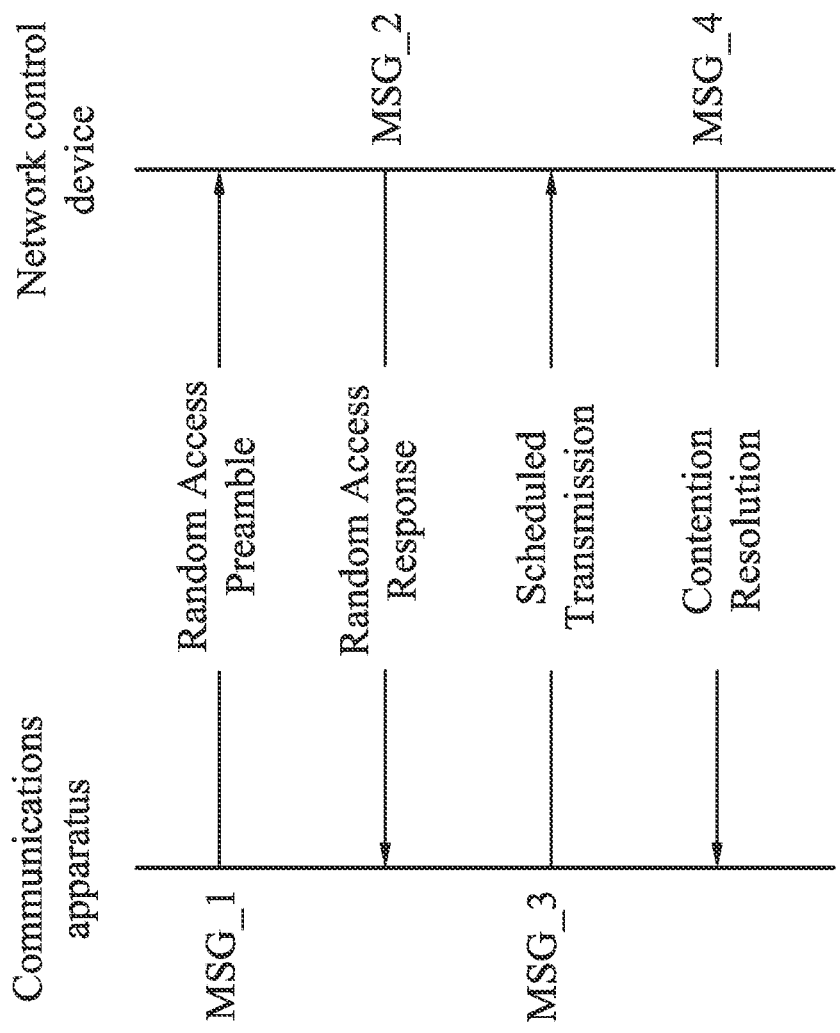
FIG. 24 shows an exemplary message flow in a random access procedure according to an embodiment of the invention.

FIG. 24 shows an exemplary message flow in a random access procedure according to an embodiment of the invention. When the communications apparatus decides to begin a random access procedure, the communications apparatus may first select a random access preamble and a physical random access channel (PRACH) resource from a random access resource pool, and then transmit the selected random access preamble in a first message MSG_1 in the selected PRACH. Upon receiving the random access preamble, the network control device may transmit the random access response in a second message MSG_2. Then, the communications apparatus may transmit the scheduled transmission in a third message MSG_3. Finally, the network control device may transmit a contention resolution in a fourth message MSG_4 and the random access procedure may be completed.

According to another embodiment of the invention, the controller of the network control device may also directly determine the position (or, the position and duration) of the training gap and transmit a signal comprising information regarding the position (or, the position and duration) of the training gap to the communications apparatus. Upon receiving the signal, the controller of the communications apparatus may obtain the information regarding the position (or, the position and duration) of the training gap.

Figure 25:
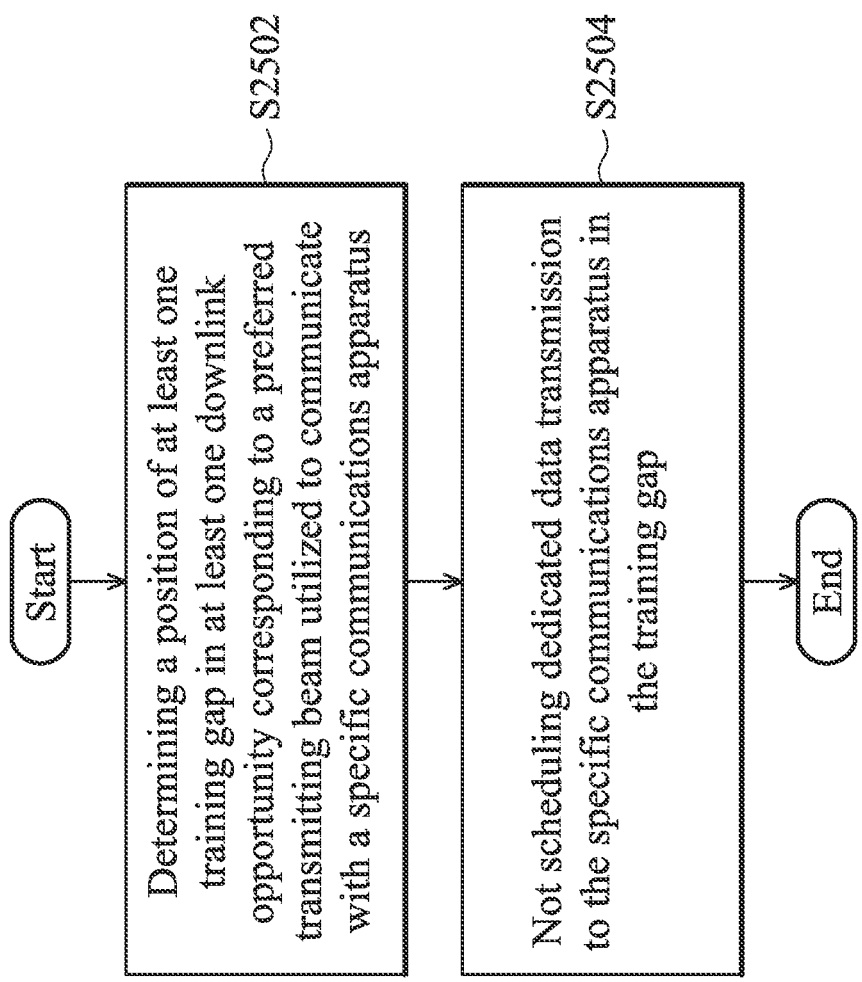
FIG. 25 is a flow chart of a method for efficient beam training for a network control entity according to the fifth aspect of the invention.

FIG. 25 is a flow chart of a method for efficient beam training for a network control entity according to the fifth aspect of the invention. The network control entity may first determine a position (or, a position and a duration) of at least one training gap in at least one downlink opportunity corresponding to a preferred transmitting beam utilized to communicate with a specific communications apparatus (Step S2502). The preferred transmitting beam utilized to communicate with a specific communications apparatus may be determined in a previous beam training procedure. The position (or, a position and a duration) may be determined (that is, obtained) according to the random access resources, the identifier, or may be simply determined by the network control entity as discussed above. Next, the network control entity may avoid scheduling dedicated data transmission to the specific communications apparatus in the training gap (Step S2504). The network control entity may schedule dedicate data transmission to the specific communications apparatus in the remaining time of the downlink opportunity corresponding to the preferred transmitting beam.

Figure 26:
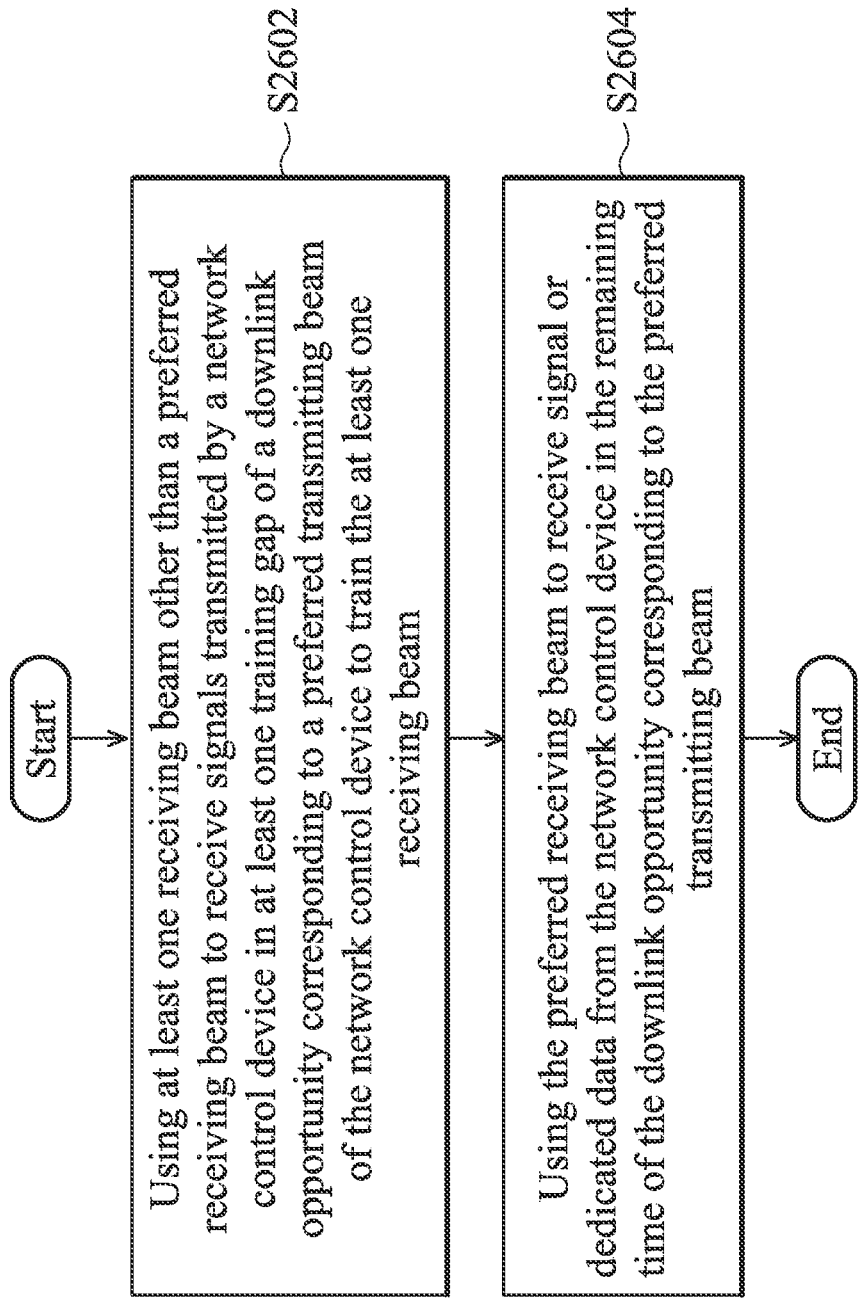
FIG. 26 is a flow chart of a method for efficient beam training for a communications apparatus according to the fifth aspect of the invention.

FIG. 26 is a flow chart of a method for efficient beam training for a communications apparatus according to the fifth aspect of the invention. The communications apparatus may use at least one receiving beam other than a preferred receiving beam to receive signals transmitted by a network control device in at least one training gap of a downlink opportunity corresponding to a preferred transmitting beam of the network control device to train the at least one receiving beam (Step S2602). The preferred receiving beam and the preferred transmitting beam may be determined in a previous beam training procedure. Next, the communications apparatus may use the preferred receiving beam to receive signal or dedicated data from the network control device in the remaining time of the downlink opportunity corresponding to the preferred transmitting beam (Step S2604).

Figure 27:
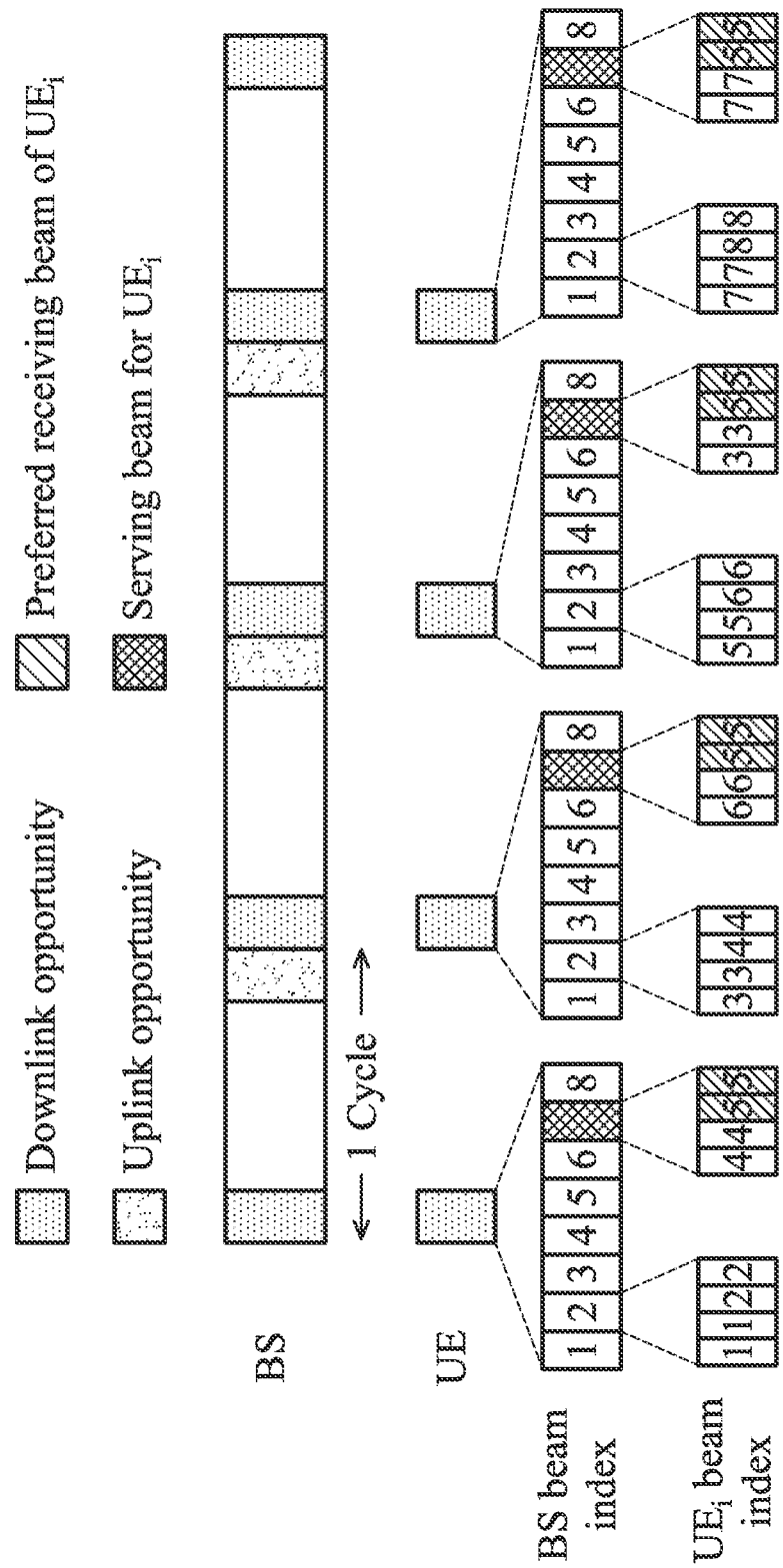
FIG. 27 shows an exemplary training scheduling of a communications apparatus according to an embodiment of the invention.

FIG. 27 shows an exemplary training scheduling of a communications apparatus according to an embodiment of the invention. In the scenario shown in FIG. 27, the $7^{th}$ beam is the preferred transmitting beam for the i-th communications apparatus $UE_i$ and may be regarded as a serving beam for $UE_i$, and the $5^{th}$ beam is the preferred receiving beam of the i-th communications apparatus $UE_i$. The communications apparatus $UE_i$ may arbitrarily train its receiving beams in the downlink opportunities corresponding to the non-serving beam, and use only the gap interval (that is, a portion of the downlink opportunities) to train its receiving beams in the downlink opportunities corresponding to the serving beam as shown in FIG. 27.

Figure 28:
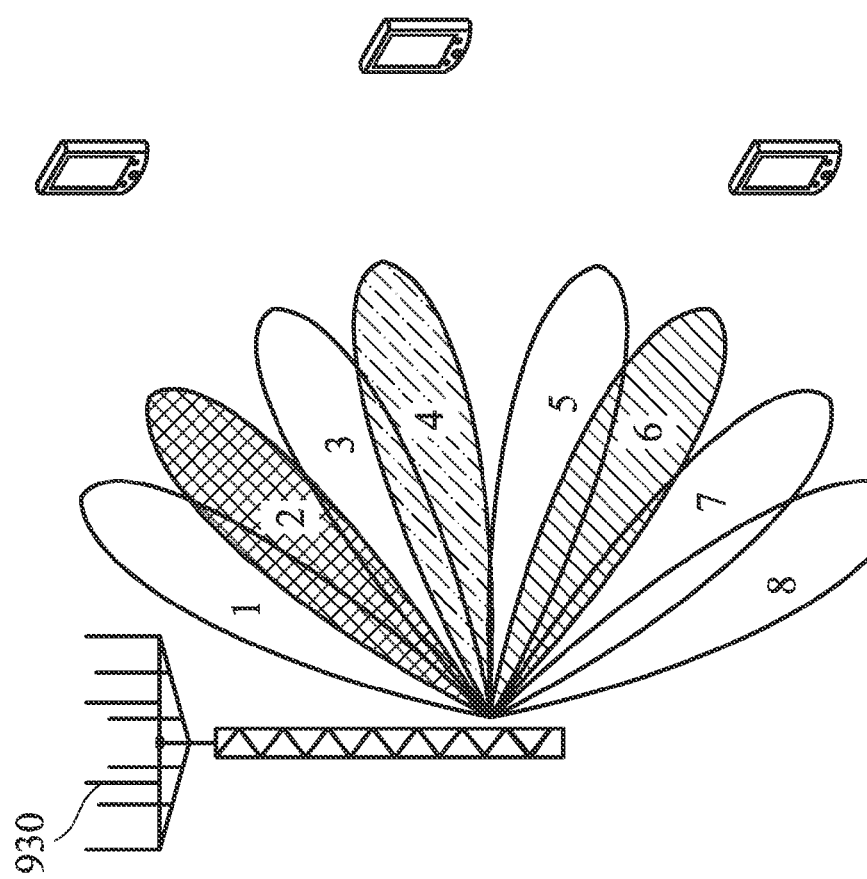
FIG. 28 shows another exemplary scenario according to the fifth aspect of the invention.

Note that the in the embodiments of the invention, the network control device may be equipped with multiple transceivers and thus have the capability of serving multiple users at a time. When the network control device serves multiple communications apparatuses at a time, the concept of the fifth aspect of invention can still be applied. FIG. 28 shows another exemplary scenario according to the fifth aspect of the invention. Suppose that the network control device 930 supports 8 beams and is equipped with multiple transceivers and thus have the capability of serving multiple communications apparatuses at the same time. The network control device 930 may use the $2^{nd}$ beam to serve a first communications apparatus, use the $4^{th}$ beam to serve a second communications apparatus and use the $6^{th}$ beam to serve a third communications apparatus.

Figure 29:
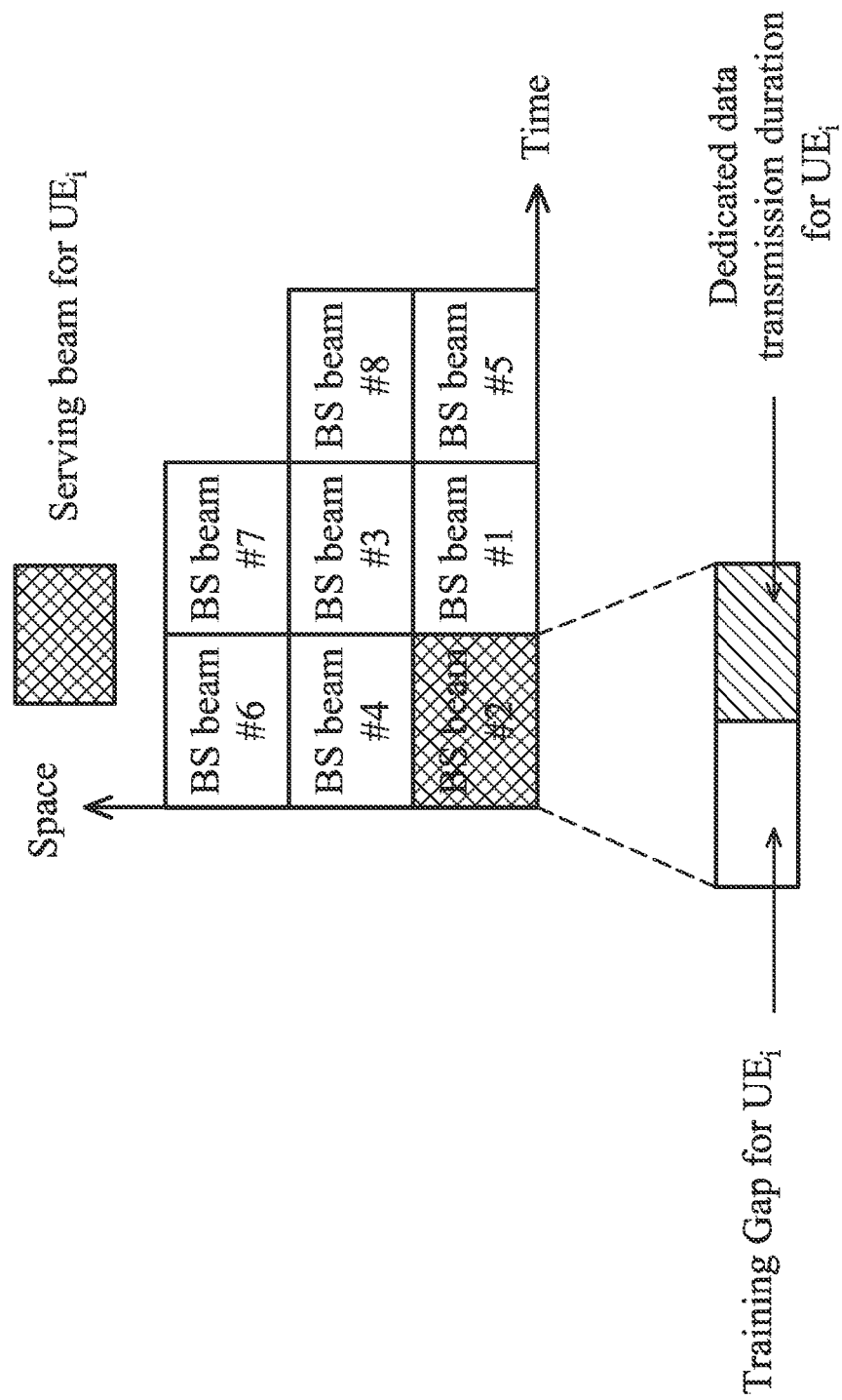
FIG. 29 is a schematic diagram showing the timing schedule of a network control device according to an embodiment of the invention.

FIG. 29 is a schematic diagram showing the timing schedule of a network control device according to an embodiment of the invention. In the scenario shown in FIG. 29, the $2^{nd}$ beam is the preferred transmitting beam for the i-th communications apparatus $UE_i$ and may be regarded as a serving beam for $UE_i$. The network control device may provide at least one training gap for $UE_i$ in the downlink opportunity of the $2^{nd}$ beam (the serving beam for $UE_i$), and may schedule dedicate data transmission for the i-th communications apparatus $UE_i$ in the remaining time (shown as the dedicated data transmission duration for $UE_i$) of the downlink opportunity of the $2^{nd}$ beam. In other words, UE-specific transmission does not occupy whole time span of its serving beam and only occupies part of the time span of its serving beam.

Figure 30:
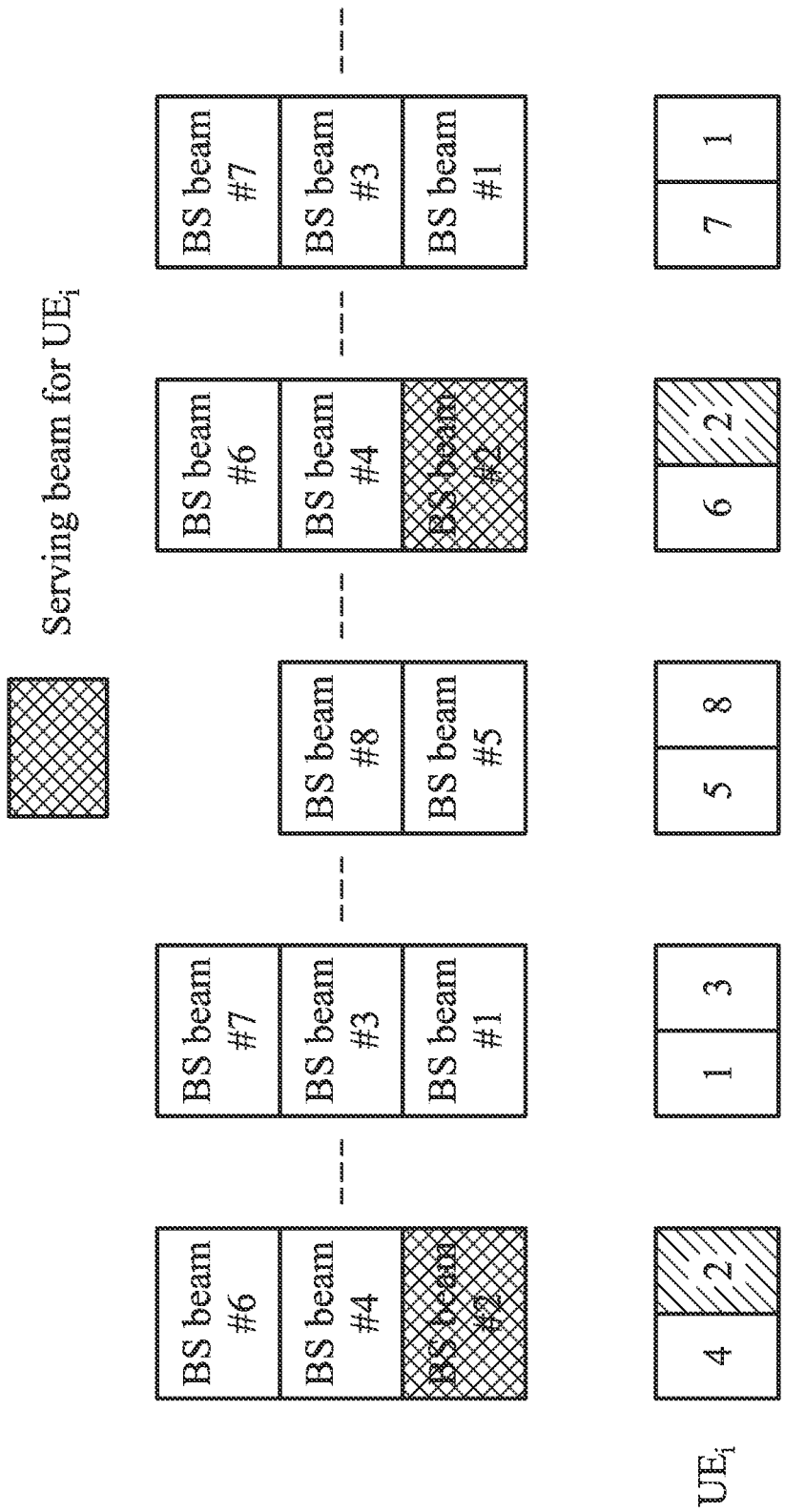
FIG. 30 shows an exemplary training scheduling of a communications apparatus with respect to the timing schedule of a network control device according to an embodiment of the invention.

FIG. 30 shows an exemplary training scheduling of a communications apparatus with respect to the timing schedule of a network control device according to an embodiment of the invention. In the scenario shown in FIG. 27, the $2^{nd}$ beam is the preferred transmitting beam for the i-th communications apparatus $UE_i$ and may be regarded as a serving beam for $UE_i$, and the $2^{nd}$ beam is the preferred receiving beam of the i-th communications apparatus $UE_i$. The communications apparatus $UE_i$ may arbitrarily train its receiving beams in the downlink opportunities corresponding to the non-serving beam, and use only the gap interval (that is, a portion of the downlink opportunities) to train its receiving beams in the downlink opportunities corresponding to the serving beam as shown in FIG. 30.

By providing training gap(s) in the downlink opportunity of the serving beam, the data loss problem which may occur when training the remaining receiving beams with respect to the serving beam can be avoided.

The embodiments of the present invention above-described can be implemented in any of numerous ways. For example, the embodiments may be implemented using hardware, software or a combination thereof. It should be appreciated that any component or collection of components that perform the functions described above can be generically considered as one or more processors that control the discussed above function. The one or more processors can be implemented in numerous ways, such as with dedicated hardware, or with general-purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A network control device, comprising:
a wireless communications module, using a preferred transmitting beam to communicate with a communications apparatus in one or more downlink opportunities corresponding to the preferred transmitting beam; and
a controller, scheduling signal or data to be transmitted in at least one downlink opportunity corresponding to the preferred transmitting beam,
wherein when scheduling signal or data to be transmitted, the controller further provides at least one training gap, in which the controller does not schedule any dedicated data to the communications apparatus, in the downlink opportunity corresponding to the preferred transmitting beam, and
wherein the controller further assigns an identifier to the communications apparatus after a random access procedure of the communications apparatus is completed, and obtains information regarding a position of the training gap according to the identifier assigned to the communications apparatus.

2. The network control device as claimed in claim 1, wherein the controller further obtains information regarding a position of the training gap according to random access resources selected by the communications apparatus.

3. The network control device as claimed in claim 2, wherein the random access resources comprise a random access preamble and a physical random access channel (PRACH) resource.

4. The network control device as claimed in claim 1, wherein the controller further obtains information regarding a position and a duration of the training gap according to random access resources selected by the communications apparatus.

5. The network control device as claimed in claim 1, wherein the controller further assigns an identifier to the communications apparatus after a random access procedure of the communications apparatus is completed, and obtains information regarding a position and a duration of the training gap according to the identifier assigned to the communications apparatus.

6. The network control device as claimed in claim 1, wherein the controller further determines a position of the training gap in the downlink opportunity corresponding to the preferred transmitting beam, and the wireless communications module further transmits a signal comprising information regarding the position of the training gap to the communications apparatus.

7. The network control device as claimed in claim 1, wherein the controller further determines a position and a duration of the training gap in the downlink opportunity corresponding to the preferred transmitting beam, and the wireless communications module further transmits a signal comprising information regarding the position and the duration of the training gap to the communications apparatus.

8. A communications apparatus, comprising:
a wireless communications module, capable of supporting a plurality of receiving beams and using a preferred receiving beam to communicate with a network control device in one or more downlink opportunities corresponding to a preferred transmitting beam of the network control device, wherein the preferred receiving beam and the preferred transmitting beam are determined in a previous beam training procedure; and
a controller, training at least one receiving beam other than the preferred receiving beam in at least one training gap of at least one downlink opportunity corresponding to the preferred transmitting beam by using the at least one receiving beam other than the preferred receiving beam to receive signals transmitted by the network control device via the preferred transmitting beam in the training gap, wherein the controller further obtains information regarding a position of the training gap according to an identifier assigned by the network control device after a random access procedure is completed.

9. The communications apparatus as claimed in claim 8, wherein the controller directs the wireless communications module to use the at least one receiving beam other than the preferred receiving beam to receive the signals transmitted by the network control device in the training gap of the downlink opportunity corresponding to the preferred transmitting beam, and directs the wireless communications module to use the preferred receiving beam to receive signals or dedicated data transmitted by the network control device in the remaining time of the downlink opportunity corresponding to the preferred transmitting beam.

10. The communications apparatus as claimed in claim 8, wherein the controller further obtains information regarding a position of the training gap according to selected random access resources.

11. The communications apparatus as claimed in claim 10, wherein the selected random access resources comprise a random access preamble and a physical random access channel (PRACH) resource.

12. The communications apparatus as claimed in claim 8, wherein the controller further obtains information regarding a position and a duration of the training gap according to selected random access resources.

13. The communications apparatus as claimed in claim 8, wherein the controller further obtains information regarding a position and a duration of the training gap according to an identifier assigned by the network control device after a random access procedure is completed.

14. The communications apparatus as claimed in claim 8, wherein the controller further obtains information regarding a position of the training gap from a signal received from the network control device.

15. The communications apparatus as claimed in claim 8, wherein the controller further obtains information regarding a position and a duration of the training gap from a signal received from the network control device.

16. A method for efficient beam training, comprising:
determining a position of at least one training gap in at least one downlink opportunity corresponding to a preferred transmitting beam of a network control device, wherein the preferred transmitting beam is determined in a previous beam training procedure and the network control device uses the preferred transmitting beam to communicate with a communications apparatus; and
not scheduling dedicated data transmission to the communications apparatus in the training gap,
wherein the position of the training gap is determined according to an identifier assigned to the communications apparatus after a random access procedure is completed.

17. The method as claimed in claim 16, further comprising:
scheduling dedicate data transmission to the communications apparatus in the remaining time of the downlink opportunity corresponding to the preferred transmitting beam.

18. The method as claimed in claim 16, wherein the position of the training gap is determined according to random access resources selected by the communications apparatus.

19. The method as claimed in claim 16, wherein the random access resources comprises a random access preamble and a physical random access channel (PRACH) resource.

20. The method as claimed in claim 16, further comprising:
transmitting a signal comprising information regarding the position of the training gap to the communications apparatus.

21. A method for efficient beam training, comprising:
training at least one receiving beam other than a preferred receiving beam of a communications apparatus in at least one downlink opportunity corresponding to a preferred transmitting beam of a network control device by using the at least one receiving beam other than the preferred receiving beam to receive signals transmitted by the network control device in at least one training gap of the downlink opportunity corresponding to the preferred transmitting beam, wherein the preferred receiving beam and the preferred transmitting beam are determined in a previous beam training procedure;
using the preferred receiving beam to receive signal or dedicated data from the network control device in the remaining time of the downlink opportunity corresponding to the preferred transmitting beam; and
obtaining information regarding a position and/or a duration of the training gap according to an identifier assigned by the network control device to the communications apparatus after a random access procedure is completed.

22. The method as claimed in claim 21, further comprising:
obtaining information regarding a position and/or a duration of the training gap according to selected random access resources.

23. The method as claimed in claim 22, wherein the selected random access resources comprise a random access preamble and a physical random access channel (PRACH) resource.

24. The method as claimed in claim 21, further comprising:
obtaining information regarding a position and/or a duration of the training gap from a signal received from the network control device.

* * * * *